US012717420B1

(12) United States Patent
Thontadarya et al.

(10) Patent No.: US 12,717,420 B1
(45) Date of Patent: Aug. 25, 2026

(54) DETECTION AND CLASSIFICATION OF INTERACTION WITH DEVICE BASED ON SENSOR OUTPUT

(71) Applicant: Amazon Technologies, Inc., Seattle, WA (US)

(72) Inventors: Niranjan Thontadarya, San Jose, CA (US); Santhosh Kumar Vojjala, Dublin, CA (US)

(73) Assignee: Amazon Technologies, Inc., Seattle, WA (US)

( * ) Notice: Subject to any disclaimer, the term of this patent is extended or adjusted under 35 U.S.C. 154(b) by 364 days.

(21) Appl. No.: 18/422,989

(22) Filed: Jan. 25, 2024

(51) Int. Cl.
*G06F 3/0346* (2013.01)
*G06F 3/01* (2006.01)
*G06F 3/0488* (2022.01)

(52) U.S. Cl.
CPC ............ *G06F 3/017* (2013.01); *G06F 3/0346* (2013.01); *G06F 3/0488* (2013.01)

(58) Field of Classification Search
CPC ....... G06F 3/017; G06F 3/0346; G06F 3/0488
See application file for complete search history.

(56) References Cited

U.S. PATENT DOCUMENTS

2018/0314914 A1* 11/2018 Kuriyama ........... G06F 18/2135
2020/0275895 A1* 9/2020 Barachant .............. G06N 20/00
2022/0198227 A1* 6/2022 Sanz-Robinson .... G06N 3/0499
2023/0072423 A1* 3/2023 Osborn .................. G16H 20/30

* cited by examiner

*Primary Examiner* — Rinna Yi
(74) *Attorney, Agent, or Firm* — Kilpatrick Townsend & Stockton LLP

(57) ABSTRACT

Techniques related to detection and classification of interaction with a device based on a sensor output is described. In an example, the device generates a first discrete sample, a second discrete sample, and a third discrete sample by sampling an output signal of a sensor of the device. The device generates, based on a first measurement window, a first value that represents a first portion of the output signal. The device determines, based on the first value, that the first portion indicates that an interaction with the device is detected and generates, based on a second measurement window, a second value that represents a second portion of the output signal. The device generates classification data indicating a classification of the interaction based on the first value and the second value and causes an operation based on the classification data.

20 Claims, 16 Drawing Sheets

DETECTION AND CLASSIFICATION OF INTERACTION WITH DEVICE BASED ON SENSOR OUTPUT

BACKGROUND

Different types of devices are available and offer different types of functionalities. For example, a smart speaker may enable voice-based interactions to request music or control other devices. Depending on its type, the device can include different types of sensors. For example, a smart speaker can include a microphone, whereas a smart home device with a display may include a microphone and a camera. A device can be interacted with to perform various operations.

BRIEF DESCRIPTION OF THE DRAWINGS

Various embodiments in accordance with the present disclosure will be described with reference to the drawings, in which.

DETAILED DESCRIPTION

Figure 1:
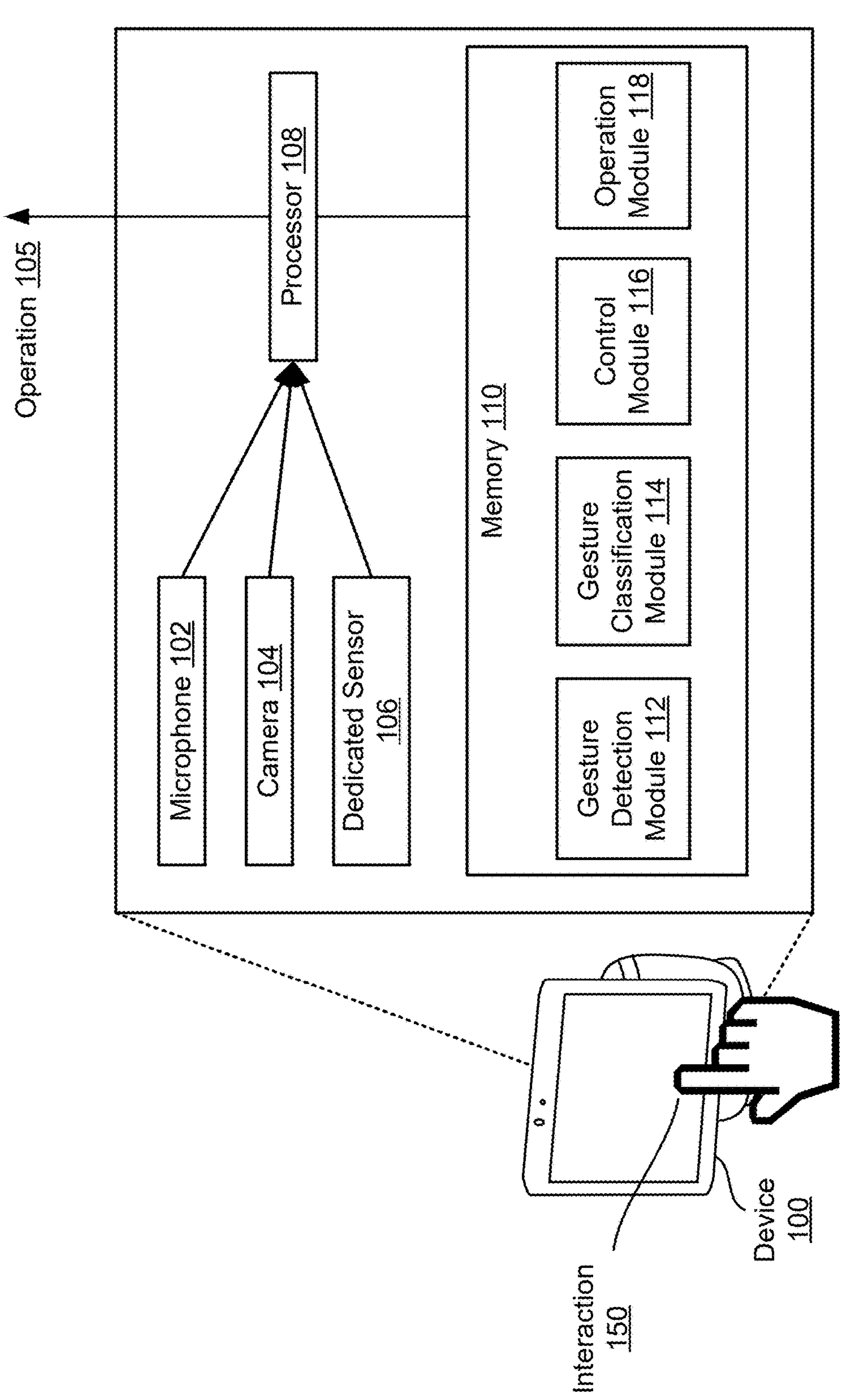
FIG. 1 illustrates an example of detection and classification of interaction with a device based on sensor output according to an embodiment of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments described herein are directed to, among other things, detection and classification of interactions with a device based on a sensor output. In an example, the device generates discrete samples by sampling an output signal of a sensor of the device. The sensor may be implemented for a function other than detecting and classifying the interactions (e.g., gesture inputs at a display of the device). Nonetheless, the output signal can be processed for the detection and classification. Generally, the output signal represents a continuous time domain analog measurement of a set of properties detected by the sensor. The output signal can be sampled to generate time series data in the digital domain. This data includes a plurality of discrete samples, each representing a value of the output signal at a point in time (e.g., a measurement value of a property at the point in time). The device can generate a first aggregated value that represents a first portion of the output signal, where the first portion has a particular time duration (e.g., 125 milliseconds). For example, the device determines a first measurement window having a time length equal to the particular time duration and including multiple time points. The device can determine discrete samples that are associated with the time points of the first measurement window and can combine the values represented by these discrete samples to generate the first aggregated value. Based on the first aggregated value (e.g., by comparing this value to a threshold value pre-defined for a set of candidate interactions), the device can determine that the first portion indicates that an interaction with the device is detected. The interaction can represent a gesture inputted at the display, such as a single tap, a double tap, a slide, a pinch, a hover, etc. The device can generate, based on a second measurement window, a second aggregated value that represents a second portion of the output signal. The device can then generate classification data indicating a classification of the interaction based on the first aggregated value and the second aggerated value (e.g., whether the interaction is a single tap, a double tap, a slide, a pinch, a hover, etc.). For example, each measurement window can be associated with a range of values, where the value ranges are pre-defined for the set of candidate interactions. The device may compare the first aggregated value to a first value range associated with the first measurement window and the second aggregated value to a second value range associated with the second measurement window. Different outcomes are possible, and each can be pre-associated with an interaction classification. For instance, a first outcome is when the first aggregated value falls within the first value range, but the second aggregated value is outside of the second value range. This first outcome is pre-associated with a single tap gesture. A second outcome is when the first aggregated value falls within the first value range and the second aggregated value falls within the second value range. This second outcome is associated with a double-tap gesture. Based on the outcome of the comparisons (e.g., the first outcome or the second outcome), the device can generate the classification data indicating the classification of the interaction (as a single tap or a second tap gesture). An operation of the device can then be executed based on the classification data. For example, for the single tap classification, the device can select a feature displayed at the user interface. Other classifications can be associated with other operations.

To illustrate, consider the example of a device that includes a microphone and a non-touchscreen display. A user can tap on the non-touchscreen display, and the microphone can generate an audio signal that represents the tap. The device can sample the audio signal to generate discrete samples. Here, each discrete sample represents a value of the audio signal at a point in time (e.g., represents the sensed audio volume level at the point in time). The device can then generate a first aggregated value for a first measurement window of 125 milliseconds (e.g., representing the aggregated audio volume level over the 125 milliseconds) and a second aggregated value for a second time measurement of 200 milliseconds (e.g., representing the aggregated audio volume level over the 200 milliseconds). For the gesture detection, the device can use the shortest measurement window (the first measurement window in this illustrative example). To detect whether any gesture is input at the non-touchscreen display, the device compares the first aggregated value to a threshold value. Assuming that the first aggregated value exceeds the threshold value, the device can detect that a gesture has occurred. As such, based on a portion of the audio signal (e.g., 125 milliseconds thereof), the device can detect that a gesture has occurred at the non-touchscreen display by processing discrete samples that represent this portion of the audio signal.

To classify the gesture, the device can determine value ranges associated with the measurement windows. The first aggregated value is compared to the first value range associated with the first measurement window. Similarly, the second aggerated value is compared to the second value range associated with the second measurement window. In this example, assume that the outcome of the comparisons indicates that the first aggregated value falls within the first value range, whereas the second aggregated value is smaller than the lower bound of the second value range. This outcome may be pre-associated with a single tap gesture (e.g., because the processing of the 125 milliseconds portion of the audio signal shows that an audio event other than noise is present, whereas the 200 milliseconds portion of the audio signal does not show an additional audio event). As such, the device can generate classification data indicating that the detected gesture is classified as a single tap. The device can also cause the non-touchscreen display to present particular content in response to the single tap.

Embodiments described herein provide several technical advantages over conventional techniques. For example, interactions with a device can be detected and classified by using an output signal of a sensor of the device, where this sensor is implemented for other functions than gesture detection and classification. Additionally, embodiments of the present disclosure describe different techniques to improve the accuracy of the signal processing such that the interactions can be detected and/or classified with more robustness. A more robust gesture detection and/or classification can result in many improvements to downstream applications.

Although embodiments are described herein as including related to a detection and classification of a gesture at a display for simplicity, embodiments are not limited to such. Instead, the embodiments similarly and equivalently apply to any type of interactions. For instance, the embodiments can be similarly and equivalently used to detect and classify a voice interaction (e.g., based on processing of non-audio signals). As another example, the interaction may relate to handling a device (e.g., picking it, moving it, rotating it, etc. based on processing of non-gyroscope sensor signals, non-accelerometer sensor signals, and/or non-inertial measurement unit (IMU) sensor signals).

FIG. 1 illustrates an example of detection and classification of interaction with a device based on sensor output according to an embodiment of the disclosure. A device 100 is shown as having various sensors including a microphone 102, a camera 104, etc. The device 100 also includes a processor 108, and a memory 110. The memory 110 stores instructions that configure the device 100 to perform various operations upon execution by the processor 108.

In an example, the memory 110 stores program code for an operation module 118. Some of the sensors (e.g., the microphone 102 and the camera 104) can have a primary function for a set of operations other than gesture detection and gesture classification. So, the operation module 118 can relate to operations associated with the primary function of a sensor. For instance, the microphone 102 may be used to detect and process audio (e.g., a primary audio function), the camera 104 may be used to generate and process image data (e.g., a primary imaging function). In each of these cases, the operation module 118 can receive an output signal from a sensor to perform the primary function. As further described herein, the output signals of any of these sensors can be used for a secondary function of gesture detection and gesture classification.

In an alternative example, rather than the gesture detection and classification being associated with a secondary function of a sensor, a sensor's primary function can be for the gesture detection and/or classification. FIG. 1 illustrates this example by showing that the device 100 includes a dedicated sensor 106. In this example, the dedicated sensor 106 implemented for that primary function. The dedicated sensor 106 may be a capacitance sensor, an electrical sensor, etc. that generates an output signal that can be used for the gesture detection and classification.

In both examples of sensor types, an output of a sensor (e.g., any of the microphone 102, the camera 104, and the dedicated sensor 106) can include a one-dimensional time-series output that can be used for the gesture detection and classification. For instance, the microphone 102 can measure audio volume and generate a voltage signal that indicate the audio volume level, etc. Generally, for any sensor, an electrical property (e.g., impedance, voltage, current, capacitance, etc.) can be measured over time in, for instance, the time domain, and used for the gesture detection and classification.

In an example, the memory 110 stores program code for a gesture detection module 112. The gesture detection module 112 can generate discrete samples by sampling an output signal of a sensor. Each discrete sample can represent a value of the output signal at a particular time point. So, a first discrete sample can represent a first value of the output signal at a first time point, a second discrete sample can represent a second value of the output signal at a second time point, a third discrete sample can represent a third value of the output signal at a third time point, and so on. The gesture detection module 112 can generate aggregated values for measurement windows for portions of the output signal. For instance, the first discrete sample and the second discrete sample may be associated with a first measurement window that corresponds to a first portion of the output signal and includes the first time point and the second time point but excludes the third time point. In addition, the first discrete sample, the second discrete sample, and the third discrete sample may be associated with a second measurement window that corresponds to a second portion of the output signal having a longer duration than the first measurement window and including the first time point, the second time point, and the third time point. The gesture detection module 112 can generate a first aggregated value for the first measurement window based on the first value and the second value. The first aggregated value can represent a portion of the output signal (e.g., by representing an aggregated measurement of the electrical property over a time duration). For instance, and referring back to the microphone 102, the first aggregated value may be an aggregated measurement of multiple voltage values representing the audio detected by the microphone over 125 milliseconds (or some other time duration). The gesture detection module 112 can also generate a second aggregated value for the second measurement window based on the first value, the second value, and the third value. The aggregated values may be a sum of the values, or a size of an area defined by the discrete samples for each measurement window.

In an example, the gesture detection module 112 may perform gesture detection using a measurement window that is associated with a shortest time duration. So, if the gesture detection module 112 determines that the first measurement window has the shortest time duration, the gesture detection module 112 can select the first measurement window to use in association with gesture detection. The gesture detection module 112 can determine from the first aggregated value that the first portion of the output signal indicates that an interaction 150 is detected at a user interface of the device 100. The gesture detection module 112 may compare the first aggregated value to a threshold value to determine whether the first portion of the output signal indicates that the interaction 150 is detected. The interaction 150 may be a gesture, such as a single tap, a double tap, a swipe, a double tap, etc. In some instances, the device 100 may only generate the second aggregated value if the first aggregated value is larger than the threshold value. Otherwise, to reduce processing, the second aggregated value may not be generated since an interaction is not detected.

In an example, the memory 110 stores program code for a gesture classification module 114. Upon the gesture detection module 112 detecting the interaction 150, the gesture classification module 114 can classify the interaction 150. The gesture classification module 114 can classify the interaction 150 based on the aggregated values for the measurement windows. The gesture classification module 114 may use a machine learning model or a state machine for the classification. For the case of using a machine learning model, the aggregated values for the first measurement window and the second measurement window can be input into the machine learning model. The gesture classification module 114 can receive an output of the machine learning model that includes classification data, where the classification data indicates a classification of the interaction 150. The classification can correspond to a particular type of gesture. For instance, the classification data may indicate the classification of the interaction 150 is a single tap. The machine learning model can be trained on a predefined set of measurement windows and a predefined set of interactions to learn associations between measurement windows and interaction classifications and accordingly generate classification data. The use of a state machine or a machine learning model to generate the classification data is further described herein below.

In an example, the memory 110 stores program code for a control module 116. Based on the classification data, the control module 116 can cause an operation 105 of the device 100. The operation 105 can be associated with the interaction 150. For instance, the classification data indicating that the interaction 150 is a single tap can result in the control module 116 causing a a presentation of particular content at the user interface of the device 100. Other classifications may result in the control module 116 causing other operations (e.g., zooming in or out, showing a different portion of a page, etc.).

Although FIG. 1 illustrates that the gesture detection module 112, the gesture classification module 114, the control module 116, and the operation module 118 are executed locally by the device 100 (e.g., by the processor 108), embodiments of the present disclosure are not limited as such. For example, all of the corresponding program codes can be executed by a remote computing resource communicatively coupled with the device 100 (e.g., a server or a cloud computing service) and/or some of the program codes (e.g., the control module 116 and the operation module 118) are executed locally by the device 100 while remaining program codes (e.g., the gesture detection module 112 and the gesture classification module 114) are executed remotely by the remote computing resource.

Figure 2:
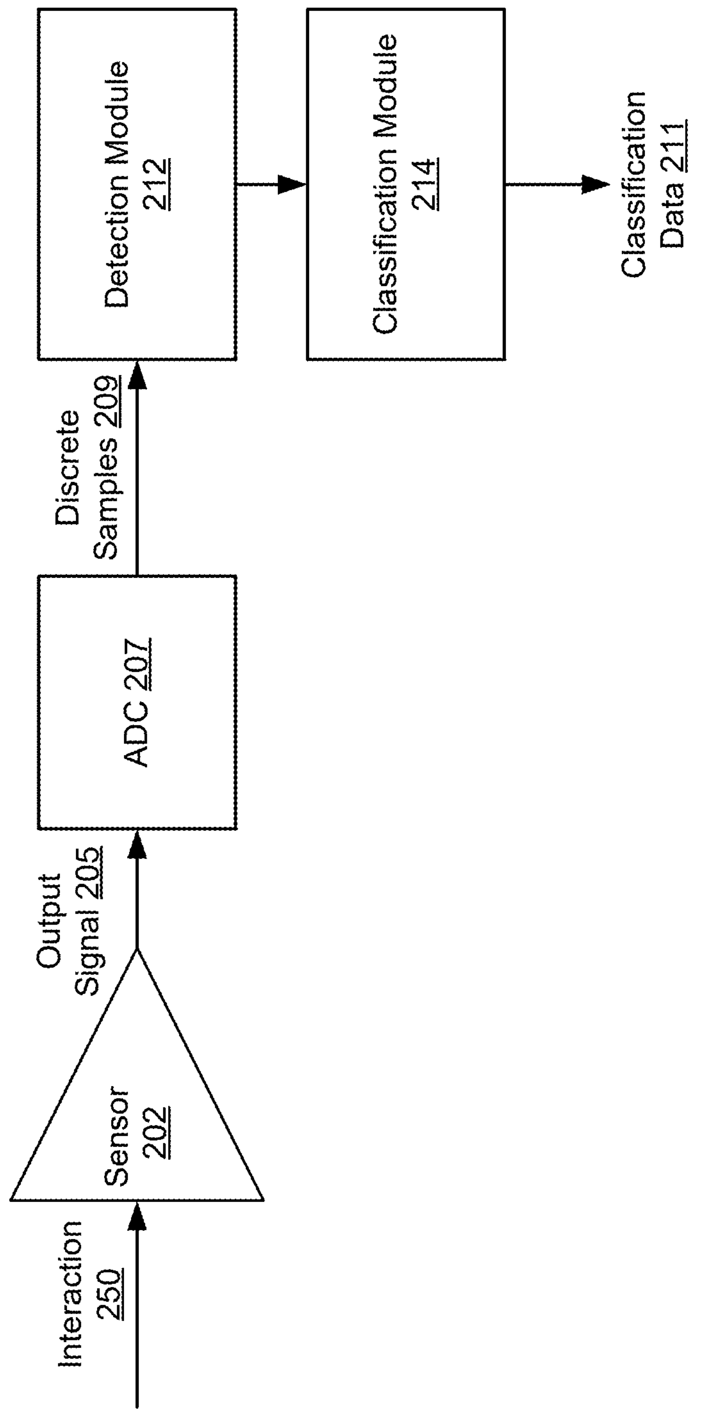
FIG. 2 illustrates a block diagram for detection and classification of interaction with a device based on sensor output according to an embodiment of the disclosure.

FIG. 2 illustrates a block diagram for detection and classification of interaction with a device based on sensor output according to an embodiment of the disclosure. An interaction 250 with a user interface of a device (e.g., device 100 in FIG. 1) can be received. A sensor 202 (e.g., a camera, microphone, a capacitance sensor, etc.) of the device can sense (as a primary function or a secondary function) the interaction 250 and generate an output signal 205. The output signal 205 can include a time-series signal representing a one-dimensional measurement intensity of a property (e.g., voltage, electrical current, impedance, capacitance, etc.). An analog-to-digital converter (ADC) 207 of the device can receive the output signal 205 and generate discrete samples 209 of the output signal 205. The ADC 207 may sample the output signal 205 at a fixed sampling rate or at a variable sampling rate to generate the discrete samples 209. A detection module 212 receives the discrete samples 209 and determines whether the discrete samples 209 indicate that an interaction is detected at the device. The detection module 212 is an example of the gesture detection module 112 in FIG. 1, so the detection module 212 can determine measurement windows for the discrete samples 209 and generate aggregated values of the discrete samples 209 for the measurement windows. The detection module 212 can compare the aggregated value for the measurement window having the shortest time duration to a threshold to determine that the output signal 205 indicates that the interaction 250 is detected. A classification module 214, which is an example of the gesture classification module 114 in FIG. 1, can then generate classification data 211 indicating a classification of the interaction 250. The classification module 214 may use a machine learning model or a state machine to generate the classification data 211 based on the aggregated values for the measurement windows.

Figure 3:
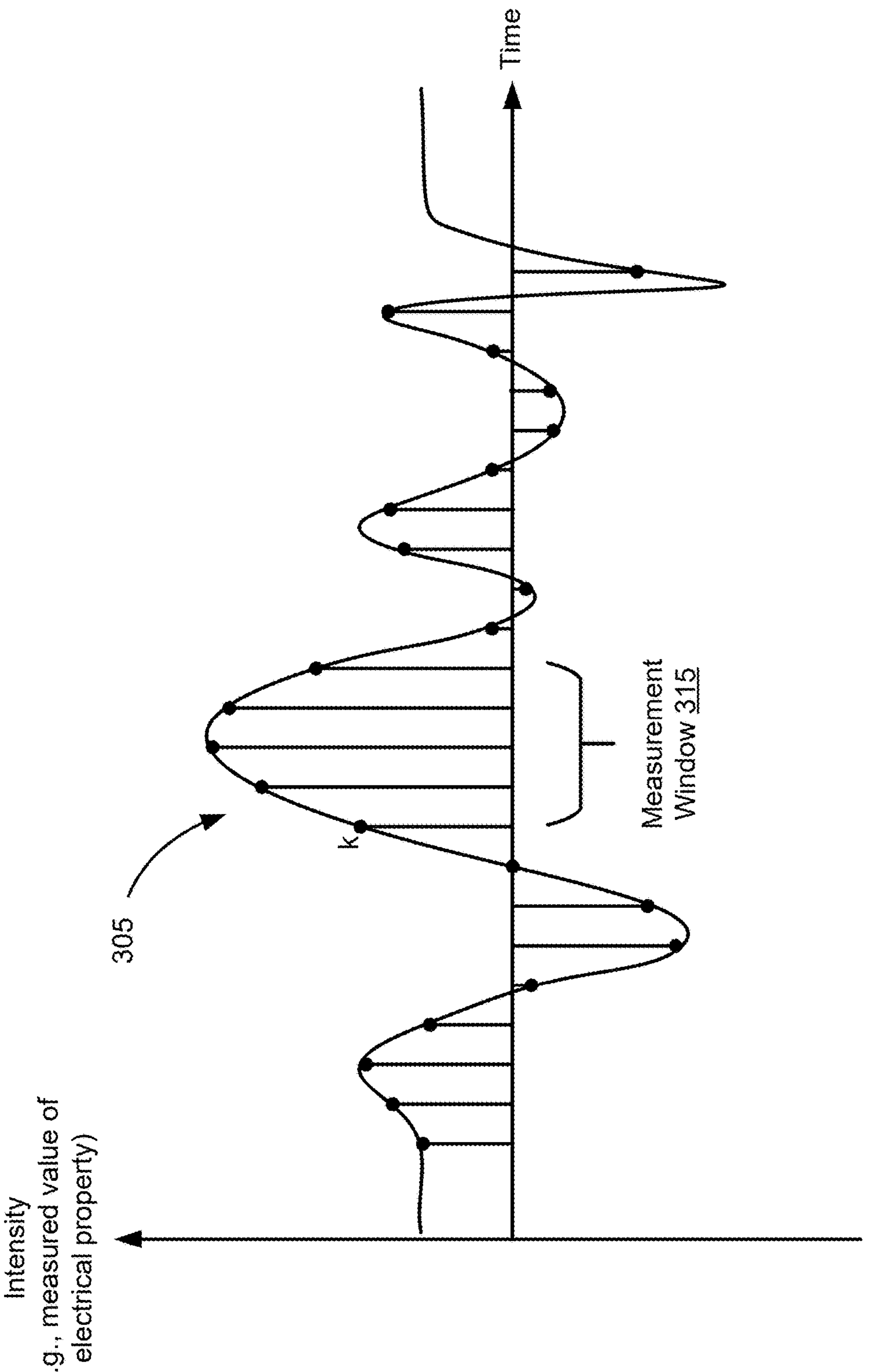
FIG. 3 illustrates an example of sampling an output signal at a fixed sampling rate according to an embodiment of the disclosure.

FIG. 3 illustrates an example of sampling an output signal 305 at a fixed sampling rate according to an embodiment of the disclosure. A fixed sampling rate represents a sampling rate that is constant (e.g., has a constant value that does not vary over time). The output signal 305 is illustrated as a graph of intensity (e.g., measurement of the electrical property, such as voltage, current, impedance, capacitance, etc.) versus time. The output signal 305 can be generated by a sensor of a device (e.g., device 10 in FIG. 1). The device can generate discrete samples by sampling the output signal 305. As illustrated in FIG. 3, the output signal 305 can be sampled at a fixed sampling rate (e.g., at a fixed rate of 60 Hz). A measurement window 315 can include a portion of the discrete samples. The device can set the length of the measurement window 315. For instance, the length may be five discrete samples long. Starting from any sample (shown as "k" in FIG. 3), five discrete samples are used in the measurement window 315. The measurement window 315 can correspond to a window for which a window sum is calculated. An aggerated value can be generated from these discrete samples. This aggregated value is referred to herein as a window sum. The window sum may be calculated as:

$$W_{k,L} = \sum_{i=k}^{L} \text{abs}(I_i)$$

Here, $I_i$ represents the sampled intensity (e.g., the value represented by the sample of the measurement of the electrical property) at time $t_i$ after removing any direct current offset. The offset k is used to represent the time offset of the first discrete sample in the measurement window. In other words, the minimum time at which the device is able to obtain the window sum $W_{k,L}$ is at $t_i$=k+L. The lengths $L_j$ of windows in this context range from the statistical duration of the shortest predefined interaction to the longest predefined interaction.

To determine an aggregated value for discrete samples in the measurement window 315, since the output signal 305 is sampled at a fixed sampling rate, the device can sum the values corresponding to the discrete samples in the measurement window 315. If the aggregated value is larger than a threshold value, the device can determine that the portion of the output signal 305 corresponding to the measurement window 315 indicates that an interaction is detected. The measurement window 315 can allow the device to not depend on an intensity value for a single time point alone for gesture detection, which can lead to false acceptances or true gesture rejections since intensity spikes may occur due to non-human or non-gesture related signals.

Figure 4:
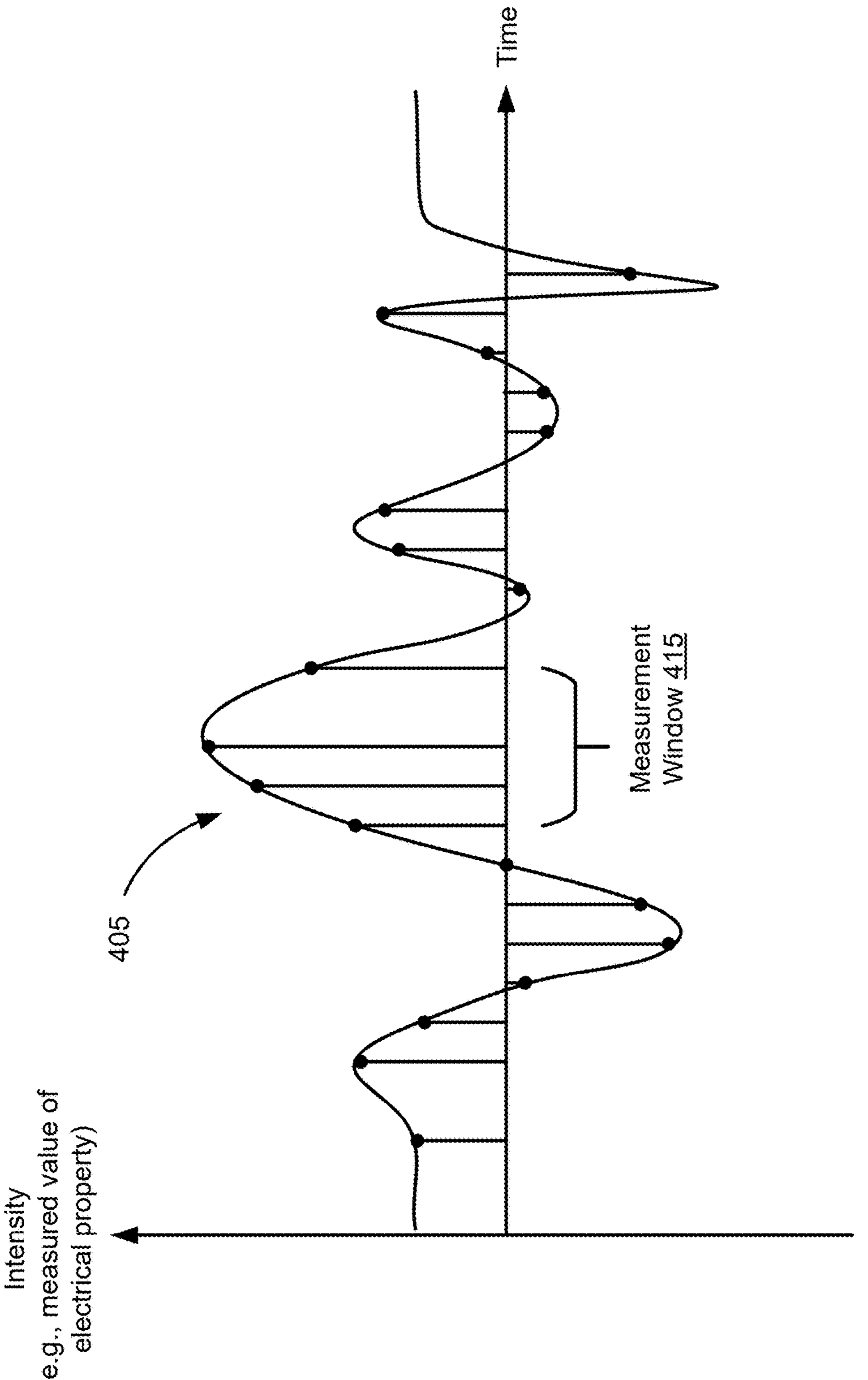
FIG. 4 illustrates an example of sampling an output signal at a variable sampling rate according to an embodiment of the disclosure.

FIG. 4 illustrates an example of sampling an output signal 405 at a variable sampling rate according to an embodiment of the disclosure. A variable sampling rate represents a sampling rate that varies (e.g., has a variable value that changes over time). The output signal 405 is illustrated as a graph of intensity (e.g., measurement of the electrical property, such as voltage, current, impedance, capacitance, etc.) versus time. The output signal 405 can be generated by a sensor of a device (e.g., device 10 in FIG. 1). The device can generate discrete samples by sampling the output signal 405. As illustrated in FIG. 4, the output signal 405 can be sampled at a variable sampling rate. A measurement window 415 can include a portion of the discrete samples. The device can set the length of the measurement window 415. An aggerated value can be generated from these discrete samples. This aggregated value is referred to herein as a window sum. With a variable sampling rate, the window sum for the measurement window 415 can be expressed as:

$$W_{k,L} = \sum_{i=k+1}^{L} (\text{abs}(I_i) + \text{abs}(I_{i-1}))(t_i - t_{i-1})/2^n \text{ where } n = \begin{cases} 1 \text{ if } (I_i * I_{i-1}) > 0 \\ 2 \text{ if } (I_i * I_{i-1}) < 0 \end{cases}$$

By calculating the window sum in this way, the device may closer approximate an area under the intensity (e.g., the area defined by the discrete samples of measurement window 415). So, to determine an aggregated value for discrete samples in the measurement window 415, since the output signal 405 is sampled at a variable sampling rate, the device can estimate a size of an area defined by the discrete samples in the measurement window 415. The aggregated value is generated based on the size. The device can then apply a threshold value on the aggregated value to determine whether the portion of the output signal 405 corresponding to the measurement window 415 indicates an interaction. Here also, the measurement window 415 can have a higher resilience to false detections and false rejections.

Generally, the sampling rate represents the number of discrete samples within a unit of time. Different reasons exist for a variable sampling rate. In one example, the sensor's primary function is not for gesture detection and classification. Instead, the primary function is to support an application (e.g., an audio application in the case of a microphone). The application can controllably vary the sampling rate over time (e.g., can increase the sampling rate upon audio detection). In another example, the discrete samples are multiplexed with other discrete samples (e.g., from other sensors). To support a variable multiplexing rate, the sampling rate can be varied.

Figure 5:
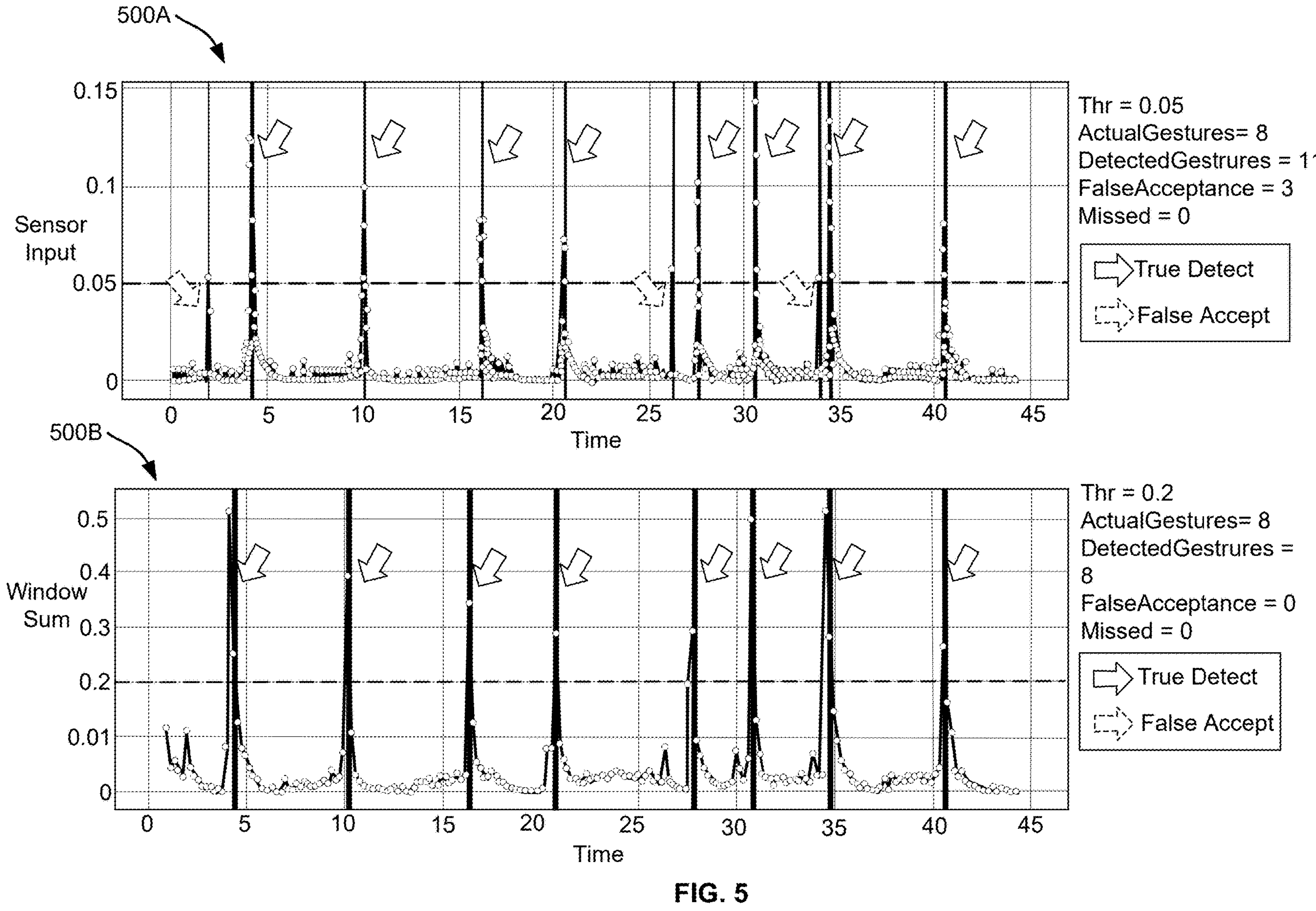
FIG. 5 illustrates examples of gesture detection with and without using a measurement window according to an embodiment of the disclosure.

FIG. 5 illustrates examples of gesture detection with and without using a measurement window according to an embodiment of the disclosure. Graph 500A shows gesture detection by a device (e.g., device 100 in FIG. 1) using simple thresholding, where a gesture is detected if the intensity crosses a threshold for any single point in time. The thresholding approach is applied directly to the magnitude of the sensor signal. Based on the applied threshold, false positives may be detected, or true gestures may be missed. The threshold value is indicated by the dashed line at 0.05. Gestures are indicated by each of the arrows, with solid arrows representing true gestures (e.g., taps) and dashed arrows representing false detections. As illustrated, eleven gestures are detected, but only eight are true gestures.

Graph 500B shows gesture detection by a device using a measurement window on the same sensor input as graph 500A. A gesture is detected if the intensity crosses threshold for aggregated values within the measurement window. In FIG. 5, the measurement window is 200 milliseconds. The window sums (derived the techniques described in FIG. 3) at gesture locations are more pronounced in graph 500B than in graph 500A. The range of acceptable threshold values can go up to 200 mV and it can scale with the number of samples in the measurement window. In this example, the threshold for the aggregated values is 0.2. All eight true gestures are detected, and there are no false acceptances.

Figure 6:
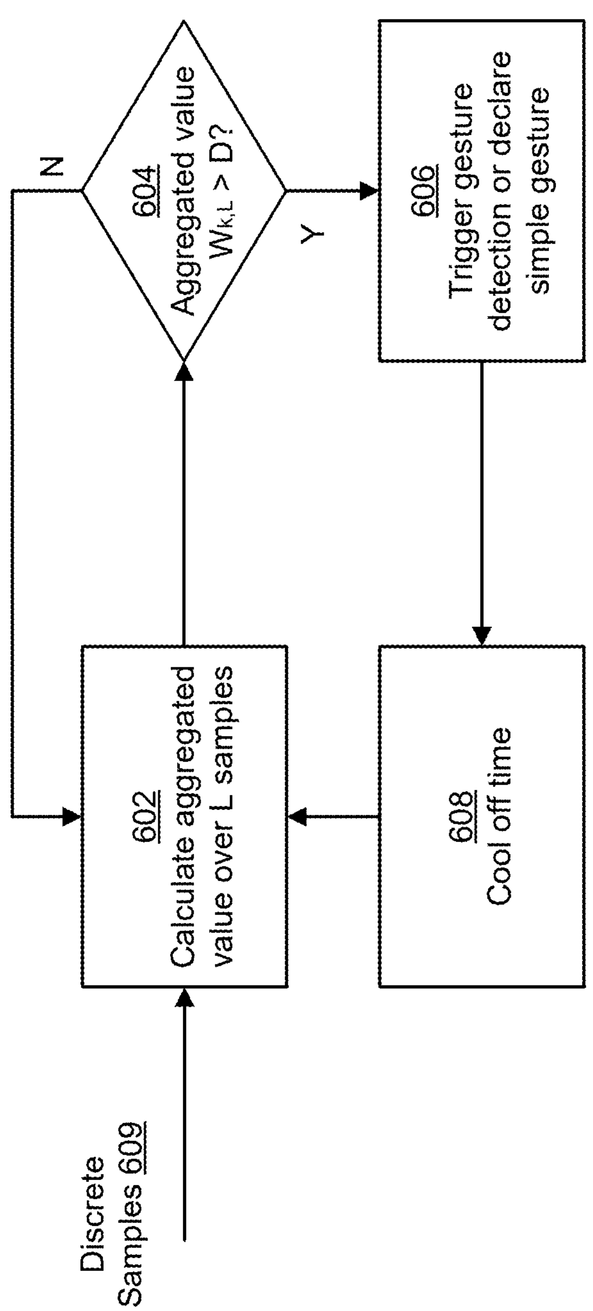
FIG. 6 illustrates an example of a flow diagram for detecting a simple gesture or triggering a gesture determination process according to an embodiment of the disclosure.

FIG. 6 illustrates an example of a flow diagram for detecting a simple gesture or triggering a gesture determination process according to an embodiment of the disclosure. In an example, a device (e.g., the device 100 in FIG. 1) can receive discrete samples 609 and calculate an aggregated value over L samples at operation 602, where these L samples belong to a measurement window (e.g., one that has the shortest time duration). The device can then determine whether the aggregated value is greater than a threshold value at block 604. Applying the threshold value on the aggregated value may be sufficient to identify that a gesture has occurred. For use cases with a single gesture, the threshold value can be determined that accurately detects this gesture and rejects most false triggers based on the application. In this way, the false rejection rate, false acceptance rate may be reduced, while the true detection rate may be increased. If the aggregated value is greater than the threshold, the device can proceed to operation 606. Otherwise, the device can return to operation 602.

At operation 606, the device can trigger a gesture detection procedure or declare a simple gesture. The simple gesture can be declared if there is only one gesture classification. As such, the aggregated value being greater than the threshold value indicates that the gesture associated with the gesture classification is detected. Otherwise, if there are multiple gesture classifications, the device can trigger the gesture detection procedure, which is further described with respect to the figures herein below. The gesture detection procedure can involve the device generating classification data indicating a classification of a detected gesture. Similarly, declaring the simple gesture can involve the device generating classification data indicating the simple gesture.

At operation 608, the device can have a cool off time. For example, upon the declaration of the simple gesture or the triggering of the gesture detection procedure, the device can forego generating additional discrete samples for a predefined time duration (e.g., 500 milliseconds) after the classification data is generated. Alternatively, the device may change values of additional discrete samples that are generated during that same or a different predefined time duration to a default value. For instance, the device may change the values to zero so that no additional gesture detection is performed during the predefined time duration. The cool off time can be used because, from a user experience, repeated gestures are not expected to occur within the predefined time period that represents the cool off time. The cool off time can further reduce the processing by the device.

Figure 7:
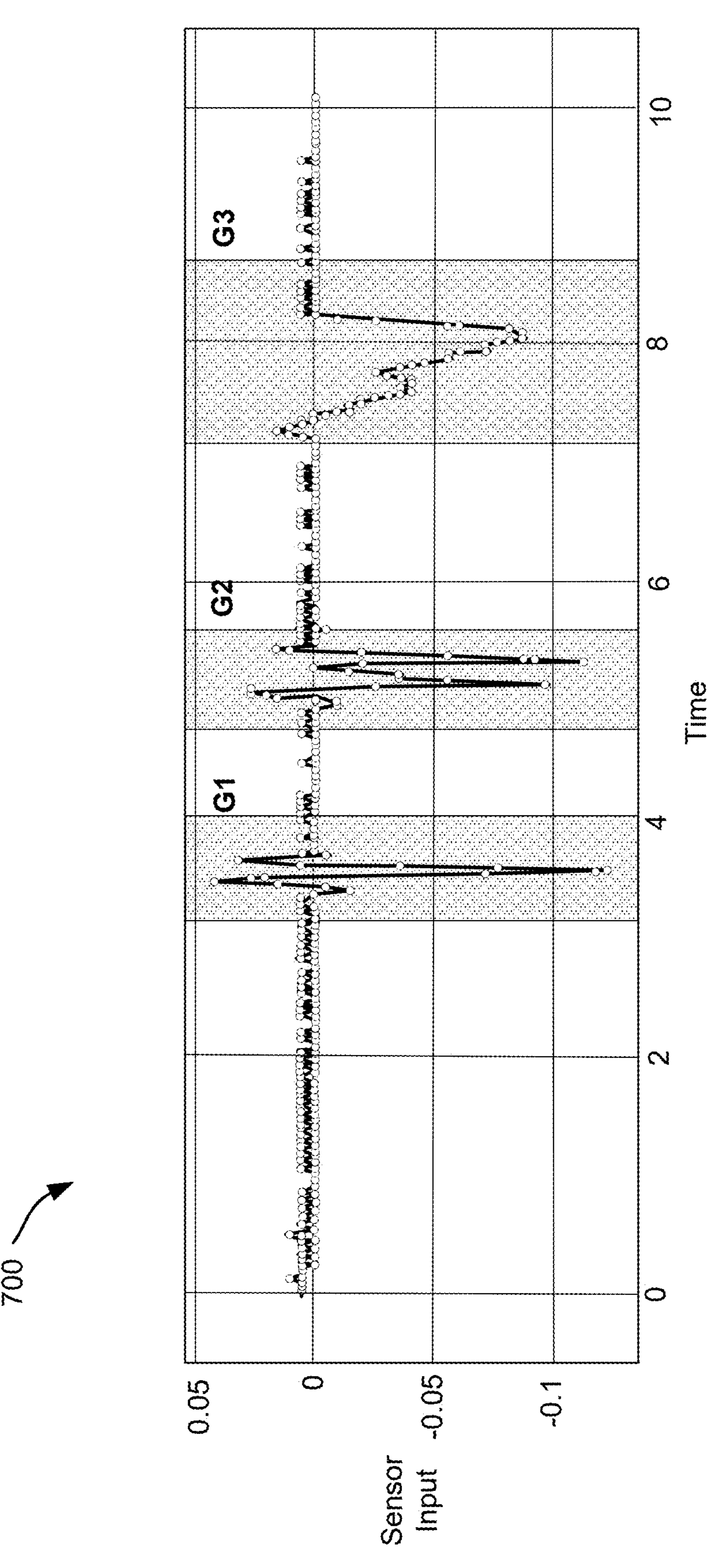
FIG. 7 illustrates an example graph of discrete samples corresponding to gestures according to an embodiment of the disclosure.

FIG. 7 illustrates an example graph of discrete samples corresponding to gestures according to an embodiment of the disclosure. Graph 700 shows the discrete samples of three gestures indicated as G1, G2, and G3. G1 may be a simple gesture (e.g., a single tap), G2 may be a first complex gesture (e.g., a swipe), and G3 may be a second complex gesture (e.g., a pinch).

Generally, the values of the discrete samples (shown on the vertical axis) of a gesture vary over time (shown on the horizontal axis). The value range for a first gesture need not be the same as the value range for a second gesture, but such a situation may be possible. Additionally, or alternatively, the time duration for a first gesture need not be the same as the time duration for a second gesture, but such a situation may be possible. In the illustration of FIG. 7, a signature for a gesture (a gesture signature) can be two-dimensional: time dimension and value dimension. In particular, in the time dimension, a particular time duration can be used. The particular time duration can be a maximum expected time length of a particular gesture type. In the value dimension, an aggregated value of the values represented by the discrete samples can be generated. The time duration for each gesture signature is illustrated by the boxes around the gesture signatures G1, G2, and G3. As such, the time duration is shortest for G1 and longest for G3. The aggregated value for a gesture signature is further described in FIGS. 9-10.

Figure 8:
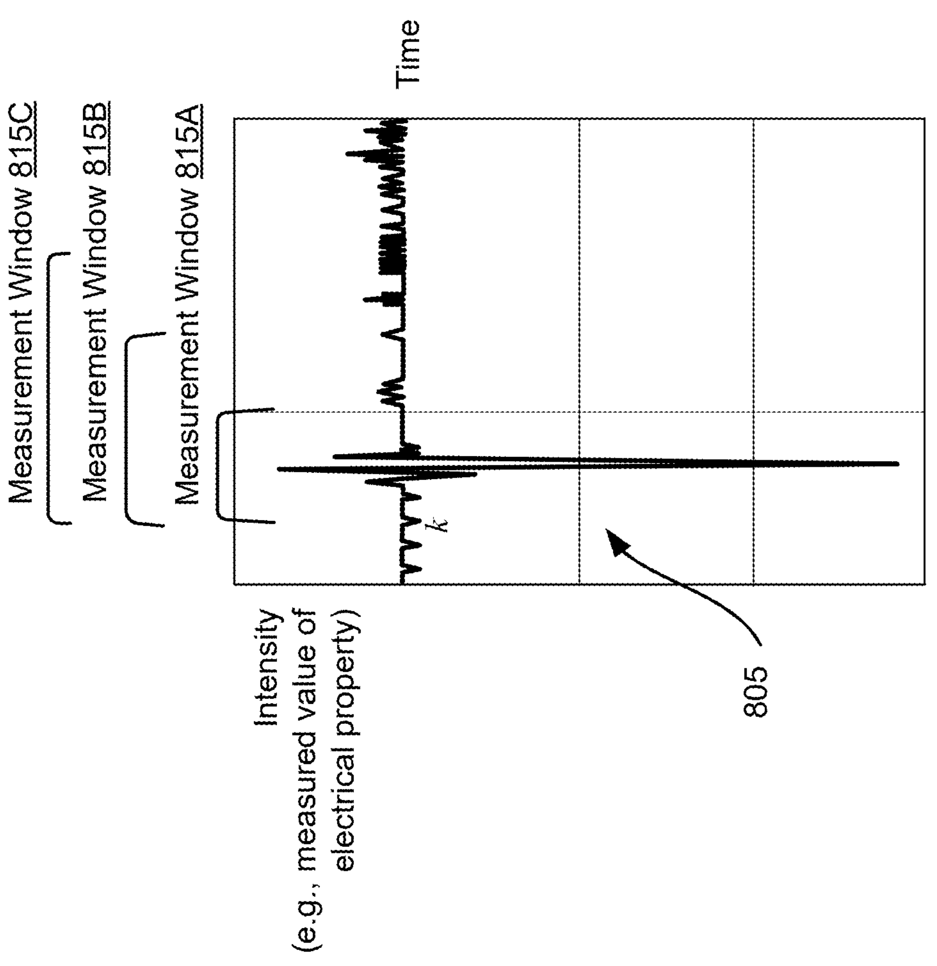
FIG. 8 illustrates examples of window measurements for an output signal according to an embodiment of the disclosure.

FIG. 8 illustrates examples of measurement windows 815A-815C for an output signal 805 according to an embodiment of the disclosure. Each of the measurement windows 815A-815C begin at location (e.g., time) k and has a different length. Measurement window 815A is the shortest measurement window and measurement window 815C is the longest measurement window. So, measurement window 815C includes time points for more discrete samples than each of measurement window 815A and measurement window 815B. An aggregated value for each of the measurement windows 815A-815C can be calculated (e.g., as a window sum per the equation of FIG. 3 or FIG. 4) to determine a gesture detection and classification. Here, the measurement windows are illustrated as starting at the same point in time (e.g, the same sample), and having different durations. However, the embodiments are not limited as such. For example, the measurement windows may partially overlap (e.g., two measurement windows can include a common set of discrete samples, and each can include a set of discrete samples excluded from the other measurement window and start at a different discrete sample).

Figure 9:
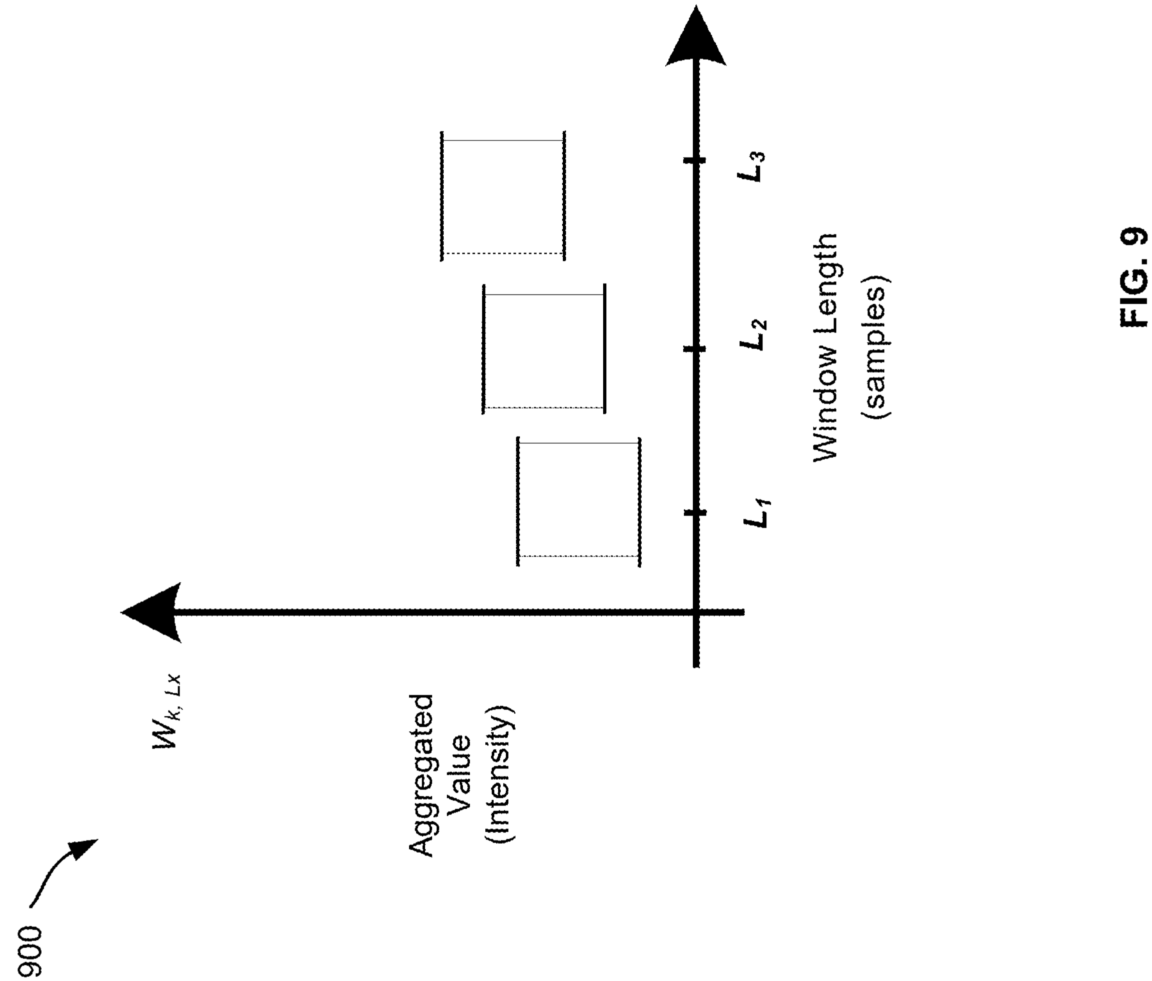
FIG. 9 illustrates a graph of value ranges versus window lengths for measurement windows according to an embodiment of the disclosure.

FIG. 9 illustrates a graph 900 of value ranges versus window lengths for measurement windows according to an embodiment of the disclosure. The time durations (shown as a window lengths) are represented by L1, L2, and L3 and can correspond to measurement windows 815A-815C in FIG. 8. That is, L1 can correspond to measurement window 815A, L2 can correspond to measurement window 815B, and L3 can correspond to measurement window 815C.

Generally, a predefined measurement window can have a time duration range, including a lower bound (shown on the left of L1, L2, or L3) and an upper bound (shown on the right of L1, L2, or L3). Further, each predefined measurement window can be associated with a range of values (shown on the vertical axis, where each value range has an upper bound and a lower bound). For example, a first predefined measurement window has a first time duration (with a time duration range centered at L1) and a first value range having a first lower bound, and a first upper bound. The two dimensional definition is represented by a first rectangle at the bottom left of the graph 900. Similarly, a first predefined measurement window has a second time duration (with a time duration range centered at L2) and a second value range having a second lower bound, and a second upper bound. The two dimensional definition is represented by a second rectangle to the right of the first rectangle. Likewise, a third predefined measurement window has a third time duration (with a time duration range centered at L3) and a third value range having a third lower bound, and a third upper bound. The two dimensional definition is represented by the utmost right rectangle in the graph 900.

Each type of gesture (e.g., classification thereof) is represented by a gesture signature using predefined measurement windows. In other words, a set of predefined measurement windows represents a candidate gesture classification. When discrete samples are processed according to actual measurement windows to generate aggregated values for the classification of a gesture, these actual measurement windows are compared to the predefined measurement windows to determine a match. A match to predefined measurement window set results in a gesture classification associated with this set.

For example, consider the illustrative use case of three predefined measurement window and two candidate gesture classifications. A first gesture classification can be associated with a first set of three predefined measurement windows: the first one having a first time duration range between 125 milliseconds and 250 milliseconds and a first value range between 0.5 and 1, the second one having a second time duration range between 300 milliseconds and 400 milliseconds and a second value range between 0.75 and 1.5, and the third one having a third time duration range between 500 milliseconds and 750 milliseconds and a third value range between 1.25 and 3. A second gesture classification can be associated with a second set of three predefined measurement windows. Here, the three predefined measurement windows have the same respective time duration ranges used in the first set. However, the respective value ranges are different: the first value range is between 0.5 and 1, whereas the second range is between 1.25 and 3, and the third range is between 3.25 and 4. Say that the three actual measurement windows 815A-815C of FIG. 8 are used, resulting in a first aggregated value of 0.6 for a first time duration of 200 milliseconds, a second aggregated value of 0.95 for a second time duration of 325 milliseconds, and a third aggregated value of 1.75 for a third time duration of 600 milliseconds. Accordingly, the time windows are matched to the first set of predefined aggregated windows. Therefore, the gesture is classified as being of the first gesture classification.

Figure 10:
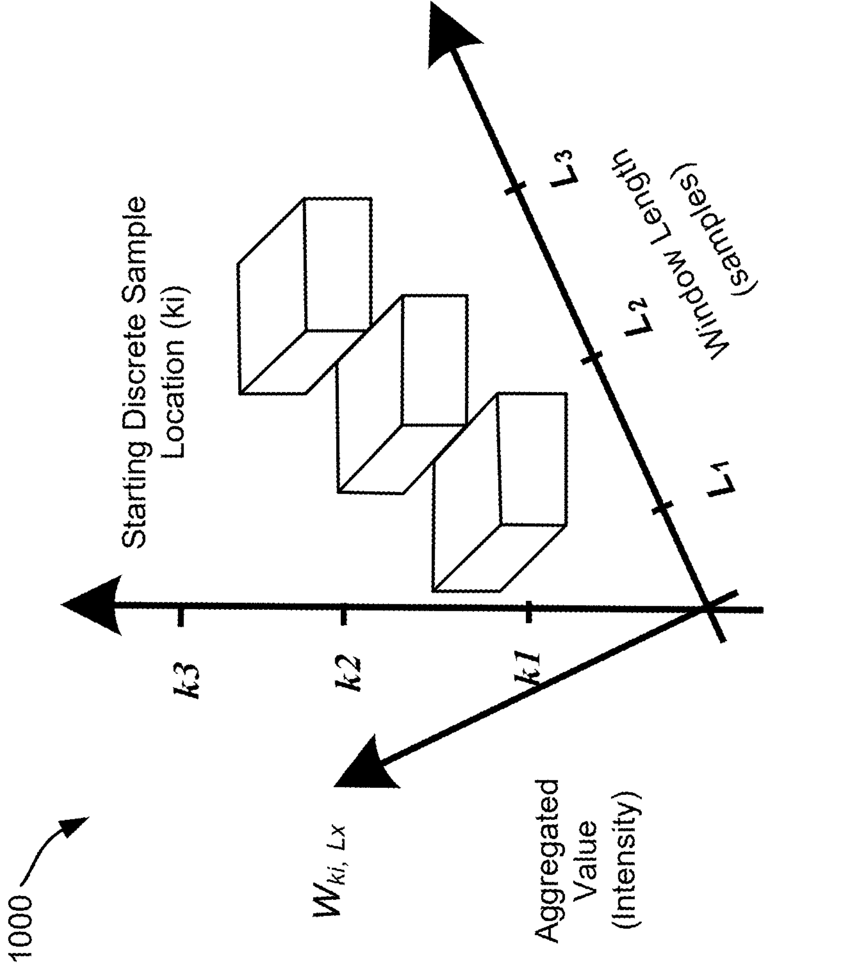
FIG. 10 illustrates a graph associated with using a discrete sample location in a gesture classification according to an embodiment of the disclosure.

FIG. 10 illustrates a graph 1000 associated with using a discrete sample location in a gesture classification according to an embodiment of the disclosure. Here, the discrete sample location represents a third time dimension (in addition to the time dimension and the value dimension, as described in FIGS. 8 and 9). In particular, in FIG. 9, the time duration for an actual measurement window can be compared to an upper threshold value and a lower threshold value defining a time duration range, and the aggregated value for the measurement window can be compared to an upper threshold value and a lower threshold value defining a value range, where these threshold values correspond to a predefined measurement window. The comparison can be repeated across the time dimension and/or the value dimension to determine a match with a predefined window measurement. In FIG. 10, a third dimension is used: the starting discrete sample location. More specifically, the starting sample location of the actual measurement window can also be compared to a starting sample range corresponding to a predefined measurement window in the determination of the match.

In FIG. 10, three axes are shown: one corresponding to the time dimension, one to the value dimension, and the third one represents k: the starting discrete sample. A device (e.g., device 100 in FIG. 1) can determine a match between an actual measurement window used to generate an aggregated value and a predefined measurement window that is associated with a particular classification (e.g., a tap). The measurement window can be associated with an index of a starting discrete sample. In addition to the matching across the first two dimensions (as described in FIG. 9), the device can determine the match along the third dimension (e.g., by determining that the starting sample of the actual measurement window is within a range of the starting sample location of the predefined measurement window).

In this way, a particular gesture can be described entirely by a set of upper thresholds $\{I_{L1}, I_{L2}, I_{L3}\}$ $(k_1)$ and lower thresholds $\{I'_{L1}, I'_{L2}, I'_{L3}\}$ $(k_1)$ at $k=k_1, k_2, k_3$, etc. Similarly, for a set of gesture classifications, there can be parameter sets of thresholds on aggregated values representing each one. The number of different step sizes of window length L and k is dependent on whether each gesture classification can be sufficiently isolated from the others by this parameter set.

Figure 11:
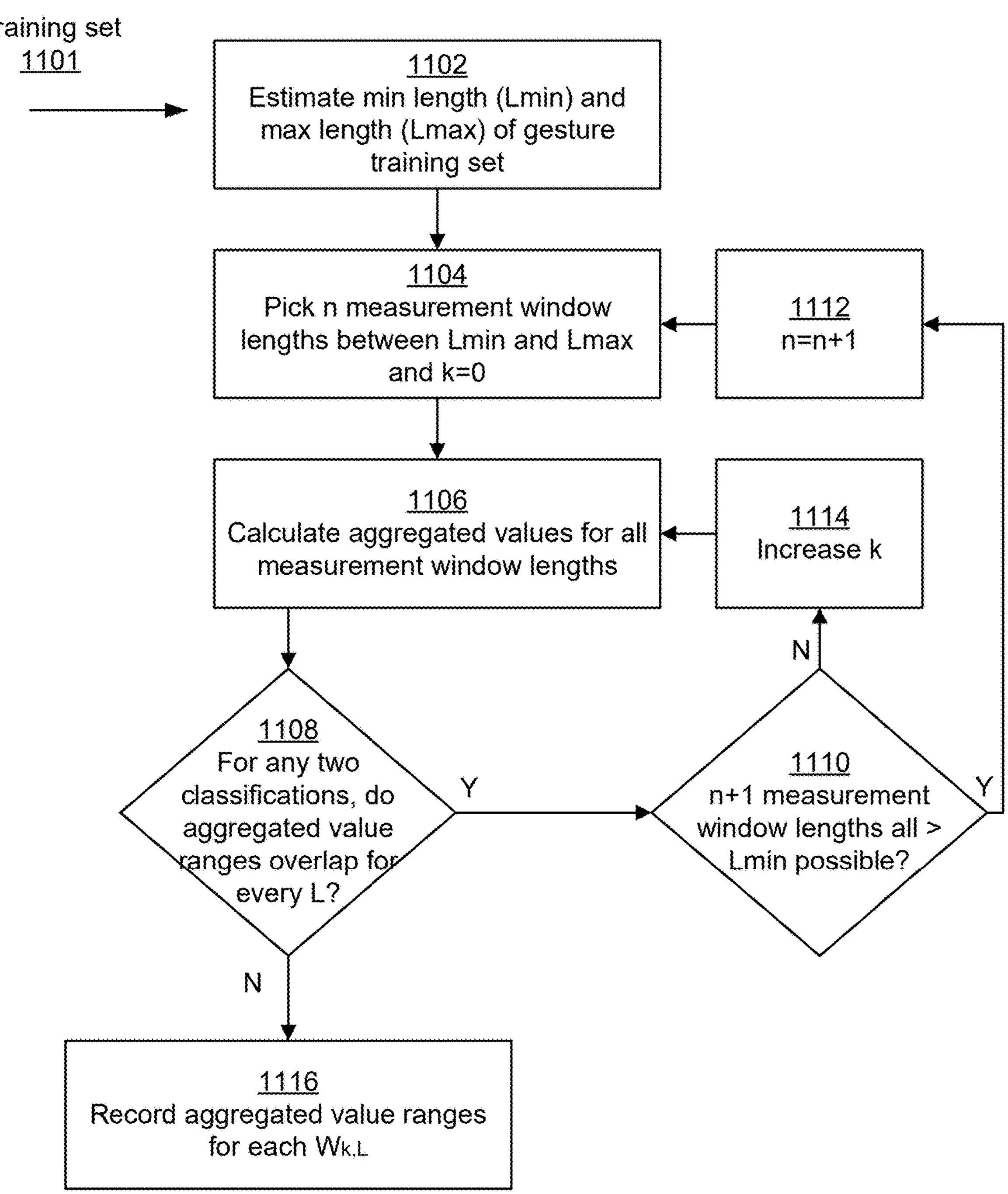
FIG. 11 illustrates an example flow for a process of defining ranges for predefined measurement windows according to an embodiment of the disclosure.

FIG. 11 illustrates an example flow for a process of defining ranges for predefined measurement windows according to an embodiment of the disclosure. In some embodiments, the process may be performed by a computer system (e.g., a system that includes one or more processors and one or more memories storing instructions that represent the process and that are executable by the one or more processors). The process (described below) is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by the one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Some or all of the process (or any other processes described herein, or variations, and/or combinations thereof) may be performed under the control of computer system configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by the one or more processors. The computer-readable storage medium may be non-transitory.

In an example, the flow includes operation 1102, where the computer system estimates a minimum length (Lmin) and a maximum length (Lmax) of a gesture training set 1101. The device can receive the gesture training set 1101, which includes labeled gesture training captures of output signals from a sensor. The labels can indicate a classification for discrete samples indicated by the gesture training captures. The minimum length and the maximum length can be minimum and maximum time durations for a predefined measurement window.

In an example, the flow includes operation 1104, where the computer system picks "n" measurement window lengths between Lmin and Lmax and sets "k" (the starting discrete sample) to zero. "n" may be predefined, or the computer system may select "n" based on a difference between Lmax and Lmin, with a greater difference corresponding to a higher number for "n."

In an example, the flow includes operation 1106, where the computer system calculates aggregated values for all measurement window lengths. The computer system can generate discrete samples of an output signal, and aggregated values of the discrete samples for time points included in each measurement window length. Each aggregated value can be associated with a particular classification.

In an example, the flow includes operation 1108, where the computer system determines whether any two classifications have aggregated value ranges that overlap for every measurement window length. The computer system can compare the aggregated values for each classification to the aggregated values for the other classifications to determine whether any of the classifications have overlapping aggregated value ranges for each measurement window length. If there is an overlap for two classifications, the process can proceed to operation 1110. Otherwise, the process can proceed to operation 1116.

In an example, the flow includes operation 1110, where the computer system determines whether it is possible to have "n+1" measurement window lengths that are all greater than the minimum length. If so, the process can proceed to operation 1112. Otherwise, the process can proceed to operation 1114.

In an example, the flow includes operation 1112, where the computer system sets "n" to be equal to "n+1." The process then continues to operation 1104.

In an example, the flow includes operation 1114, where the computer system increases "k." For instance, the increase is by a predefined increment (e.g., a value of "1").

In an example, the flow includes operation 1116, where the computer system records the aggregated value ranges for each measurement window. The aggregated value ranges can then be used to match aggregated values for discrete samples of output signals to classify gestures detected in the output signals.

Figure 12:
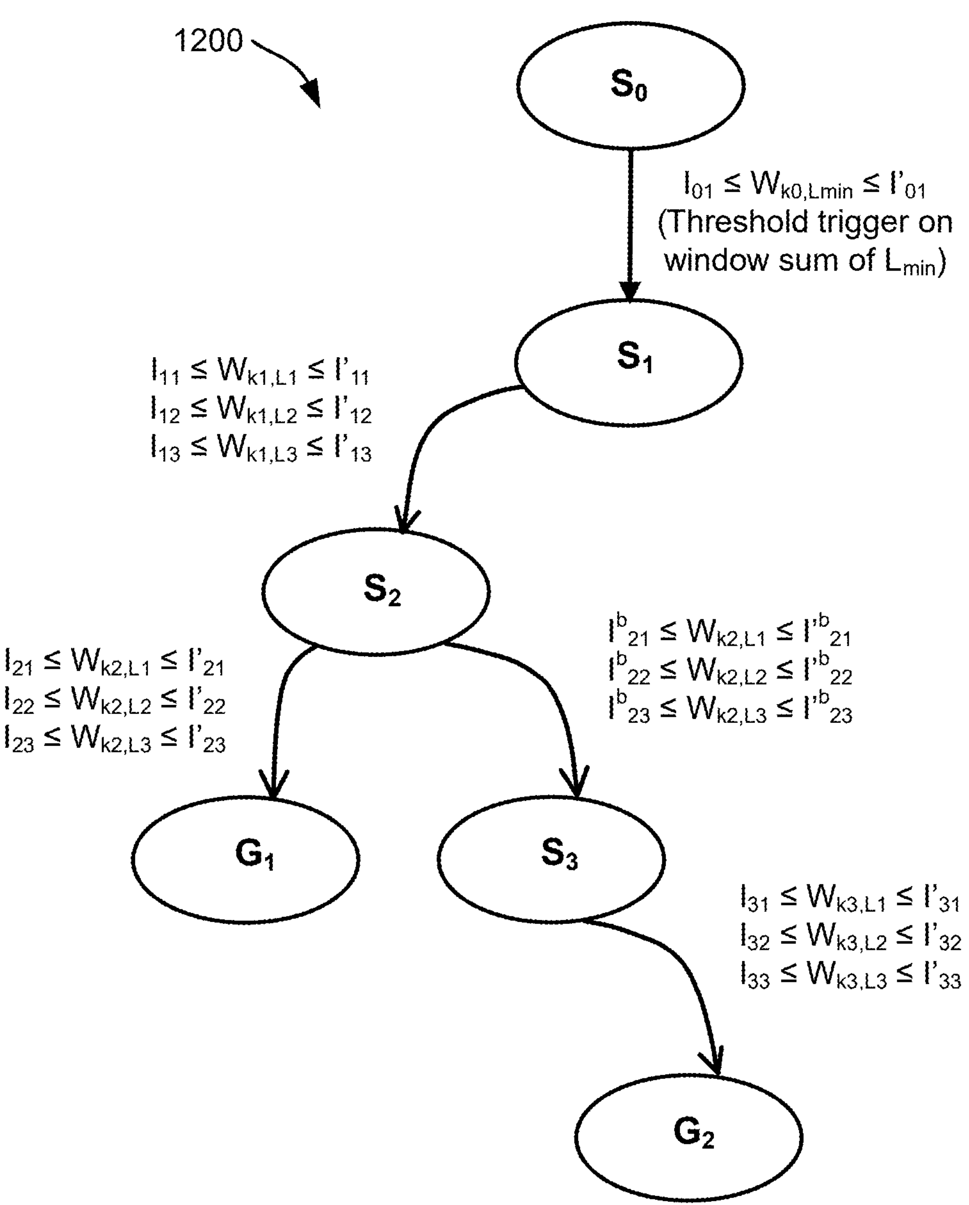
FIG. 12 illustrates an example of a state machine for classifying gestures based on sensor output according to an embodiment of the disclosure.

FIG. 12 illustrates an example of a state machine 1200 for classifying gestures based on sensor output according to an embodiment of the disclosure. Here, S0 represents an initial sate, Sx (where x≥1, e.g., $S_1$, and $S_2$) represents an intermediate state, and $G_x$ (e.g., $G_1$, and $G_2$) represent states where a gesture is fully detected and classified a gesture. For simplicity, only three measurement windows are shown. Each transition between two is associated with predetermined threshold ranges. A transition is followed if the aggregated values for a set of measurement windows fall within predetermined threshold ranges. For simplicity, the implied state transition from every state back to $S_0$ whenever the aggregated values are outside of any of the threshold regions which can take them to the next state are not shown. The state machine 1200 can be as large as needed for the size of the candidate gesture classifications. The gesture states $G_x$ can correspond to the candidate gesture classifications. The initial state $S_0$ can be the first state (or the default state) of the state machine when the state machine is invoked or when a transition back occurs. When a gesture is detected, the state machine is updated to transition from the initial state $S_0$ to the next state $S_1$. When a transition back from an intermediate state occurs (because at least one of value ranges is not met), the state machine returns to the initial state $S_0$. Upon a gesture being detected, different sets of measurement windows are used to determine an aggregated value per measurement window and compare the aggregated value per measurement window to a value range for that measurement window. The result of the comparisons can trigger transition to a next state or back to the initial state. In the three dimensional use case of FIG. 10, each set can be associated with a starting discrete sample location. Each set can then be compared (in FIG. 12, each set has a size of three, indicating that three measurement windows are used per set) to the threshold value ranges defined for a transition to a next state (which can be one of many possible next states) to determine a match. If a match is found, the transition to the next state occurs. If not, the state machine is re-initialized to the initial state $S_0$. The next state can correspond to a different set of predefined measurement window. This process is repeated until a gesture state $G_x$ is reached, or the state machine is re-initialized to the initial state $S_0$. If a gesture state is reached, the corresponding gesture is indicated in classification data.

In an example, aggregated values for multiple measurement windows can be determined from sampling an output signal of a sensor. The measurement windows can have different lengths. Based on an aggregate value a measurement window, a device (e.g., device 100 in FIG. 1) can determine a first state (e.g., $G_1$) of the state machine 1200 that represents a classification. A second state (e.g., $G_2$) of the state machine 1200 can represent a different classification. A state transition between the two states can be associated with a range of values for an aggregated value for another measurement window. The device can determine the state transition to the first state based on a first comparison of a first aggregated value for a measurement window with a range of values and a second comparison of a second aggregated value for another measurement window with another range of values. The ranges of values can be predefined for the classification associated with the first state.

In an example, a first state (e.g., $S_1$) of the state machine 1200 represents a gesture detection. The device can determine the first state based on a comparison of an aggregated value for a measurement window with a first threshold value. The device can then determine a state transition to a second state based on a comparison of a second aggregated value for a second measurement window with a second threshold value. Classification data can be generated based on the second state and the classification data can indicate the classification associated with the second state.

Figure 13:
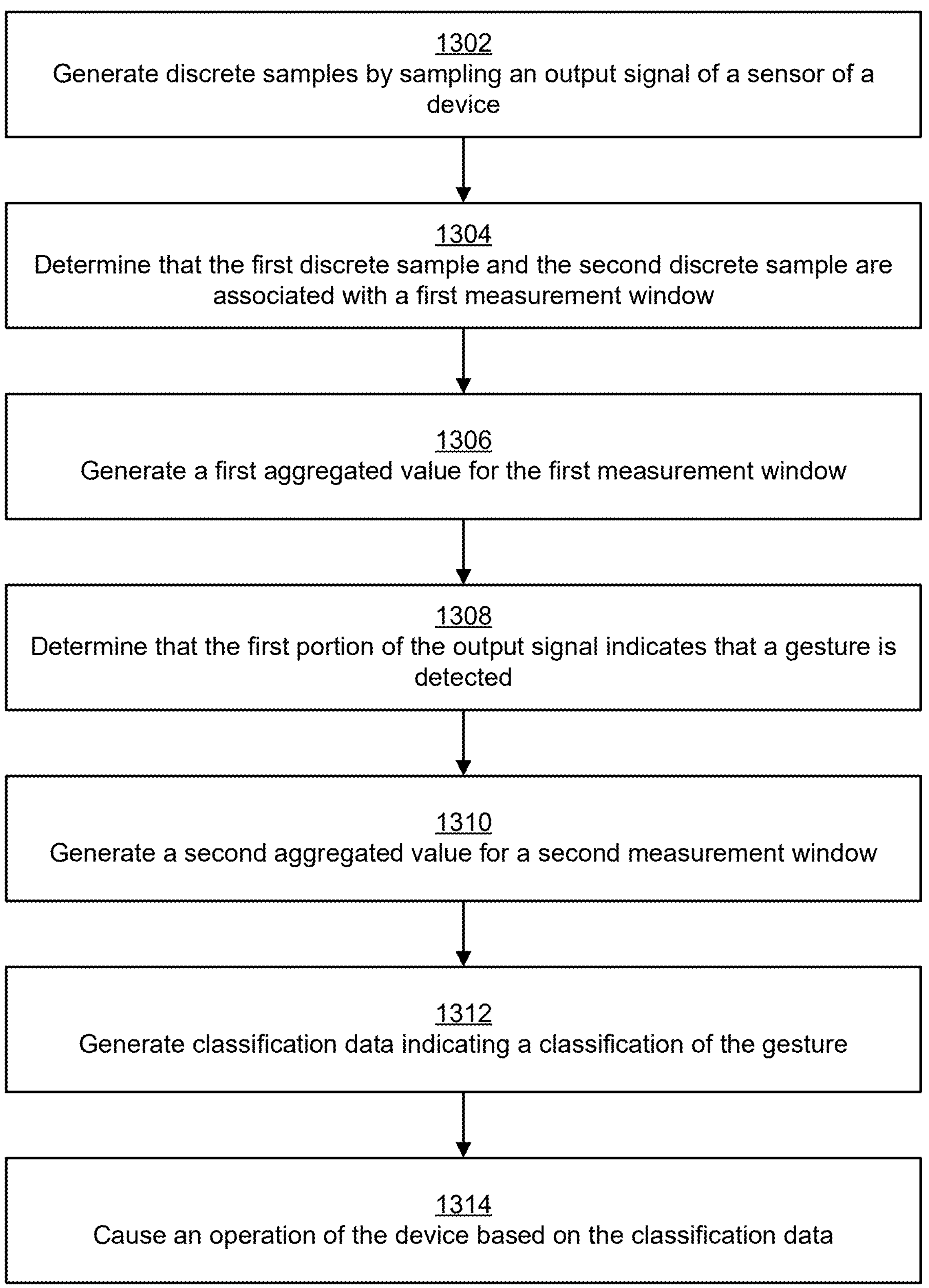
FIG. 13 illustrates an example flow for a process of detection and classification of an interaction with a device based on sensor output according to an embodiment of the disclosure.
Figure 14:
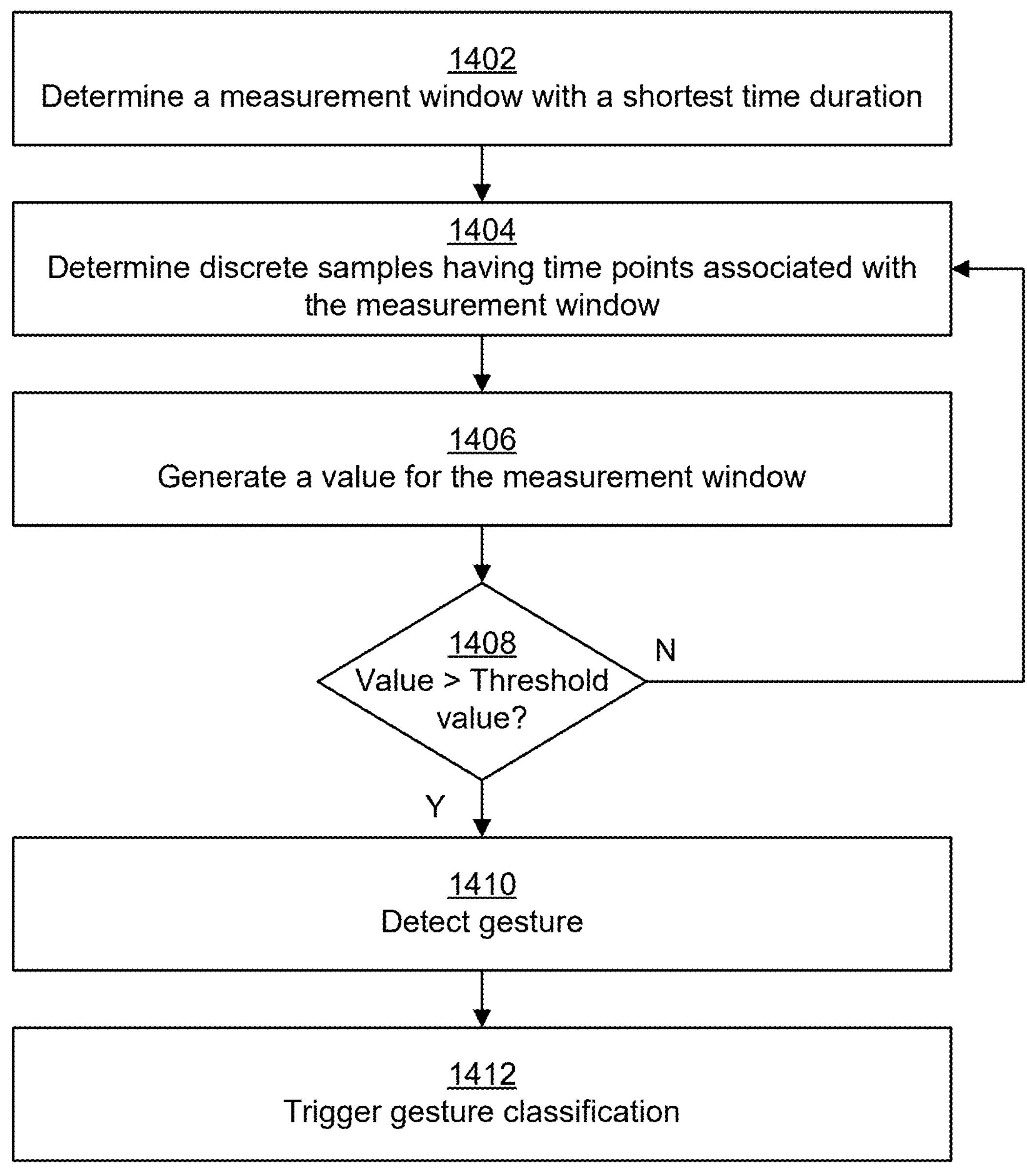
FIG. 14 illustrates an example flow for a process of gesture detection of an interaction with a device based on sensor output according to an embodiment of the disclosure.
Figure 15:
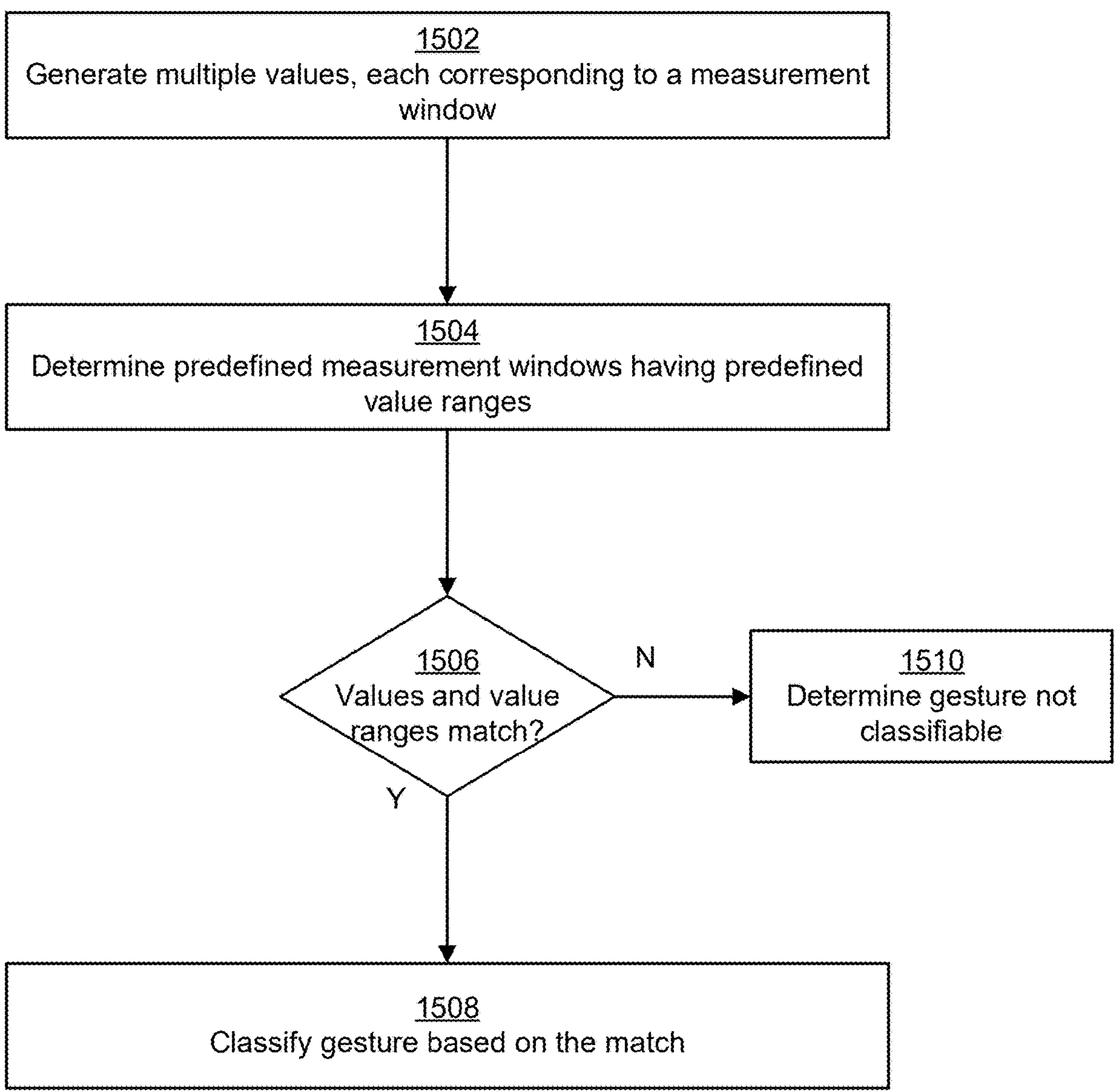
FIG. 15 illustrates an example flow for a process of gesture classification of an interaction with a device based on sensor output according to an embodiment of the disclosure.

FIGS. 13-15 illustrate example flows for processes related to multi device-based presence processing according to an embodiment of the disclosure. In some embodiments, the processes may be performed by a device described herein (e.g., device 100 in FIG. 1). The processes (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Some or all of the processes (or any other processes described herein, or variations, and/or combinations thereof) may be performed under the control of the device configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

FIG. 13 illustrates an example flow for a process of detection and classification of an interaction with a device based on sensor output according to an embodiment of the disclosure. In an example, the flow includes operation 1302, where the device generates discrete samples by sampling an output of a sensor of a device. The sampling may be at a fixed sampling rate or a variable sampling rate. The discrete samples can include a first discrete sample representing a first value of the output signal at a first time point, a second discrete sample representing a second value of the output signal at a second time point, and a third discrete sample representing a third value of the output signal at a third time point.

In an example, the flow includes operation 1304, where the device determines that the first discrete sample and the second discrete sample are associated with a first measurement window. The first measurement window can include the first time point and the second time point and exclude the third time point. The first measurement window can correspond to a first portion of the output signal.

In an example, the flow includes operation 1306, where the device generates a first aggregated value for the first measurement window. The first aggregated value can be generated based on the first value and the second value. If the discrete samples are sampled at a fixed sampling rate, then the device can generate the first aggregated value by summing values corresponding to the discrete samples, as described in FIG. 3. If the discrete samples are sampled at a variable sampling rate, then the device can generate the first aggregated value by estimating a size of an area defined by the first discrete sample and the second discrete sample, as described in FIG. 4.

In an example, the flow includes operation 1308, where the device determines that the first portion of the output signal indicates that a gesture is detected. The indication of the gesture being detected can be determined based on the first aggregated value exceeding a threshold value. The gesture can be detected at a user interface of the device. This threshold value can be predefined for multiple types (or classifications) of detectable gestures. For example, the threshold value can be the lower bound of the value range of the shortest measurement window.

In an example, the flow includes operation 1310, where the device generates a second aggregated value for a second measurement window. The second aggregated value is generated based on the first value, the second value, and the third value. The second measurement window can include the first time point, the second time point, and the third time point. The second measurement window can correspond to a second portion of the output signal and can have a longer time duration than the first measurement window. In an example, the first and second measurement windows have the same starting discrete sample, as illustrated in FIG. 8.

In an example, the flow includes operation 1312, where the device generates classification data indicating a classification of the gesture. The classification data can be generated by a machine learning model or a state machine based on the first aggregated value and the second aggregated value, as described herein above.

In an example, the flow includes operation 1314, where the device causes an operation of the device based on the classification data. The operation may be a different operation than what the sensor is configured to support as part of a primary function. For instance, the operation may be a selection of an item displayed at the user interface, a zooming in at the user interface, a change to a view of the user interface, etc. The different operation may be audio processing, image processing, or data transmission.

FIG. 14 illustrates an example flow for a process of gesture detection of an interaction with a device based on sensor output according to an embodiment of the disclosure. In an example, the flow includes operation 1402, where the device determines a measurement window with a shortest time duration. The computer system can compare multiple measurement windows to determine the measurement window with a shortest time duration.

In an example, the flow includes operation 1404, where the device determines discrete samples having time points associated with the measurement window. The computer system can determine time points associated with the measurement window and then determine discrete samples of an output signal of a sensor of a device that are associated with the time points of the measurement window.

In an example, the flow includes operation 1406, where the device generates a value for the measurement window. The value can be an aggregated value of the values represented by the discrete samples for the time points. For instance, the aggregated value may be a window sum per the description of FIG. 3 or FIG. 4.

In an example, the flow includes operation 1408, where the device determines whether the value is greater than a threshold value. The computer system can compare the value to the threshold value. If so, the flow can proceed to operation 1410. Otherwise, the flow can return to operation 1404, where the device determines new discrete samples to process.

In an example, the flow includes operation 1410, where the device detects a gesture. The gesture is detected based on the value being greater than the threshold value. The computer system determines that a portion of the output signal corresponding to the measurement window indicates the gesture is detected at a user interface of a device.

In an example, the flow includes operation 1412, where the device triggers gesture classification. The gesture classification can involve identifying a particular gesture that is occurring at the user interface. The computer system may use a machine learning model or a state machine for the gesture classification. Gesture classification is further described in FIG. 15 herein below.

FIG. 15 illustrates an example flow for a process of gesture classification of an interaction with a device based on sensor output according to an embodiment of the disclosure. In an example, the flow includes operation 1502, where the device generates multiple values, each corresponding to a measurement window. Each value can correspond to an aggregated value generated based on discrete samples of an output signal having time points associated with the measurement window.

In an example, the flow includes operation 1504, where the device determines predefined measurement windows having predefined value ranges. The predefined measurement windows and predefined value ranges are each associated with a particular gesture classification. Each gesture classification may be associated with multiple predefined measurement windows.

In an example, the flow includes operation 1506, where the device determines whether the values match the predefined value ranges. The device can compare the values to the value ranges to determine the match. If there is a match, the flow can proceed to operation 1508. Otherwise, the flow can proceed to operation 1510.

In an example, the flow includes operation 1508, where the device classifies the gesture based on the match. If the aggregated values for multiple measurement windows match the value ranges for each of the measurement ranges for a particular gesture, the computer system can classify the gesture based on the match. For instance, the device can classify the gesture as the particular gesture based on the match. The device can then cause an operation at the device based on the classification.

In an example, the flow includes operation 1510, where the device determines the gesture is not classifiable. If the gesture is not classifiable, the device may proceed to generating and processing additional discrete samples for other portions of the output signal to classify other potential gestures indicated by the output signal.

In the example flow of FIG. 15, the matching and classification (e.g., per operations 1506-1510) can be implemented using a state machine. For example, upon the gesture detection, the state machine is initialized to an initial state. The transition from the initial state to a next state can be associated with predefined value ranges (e.g., as defined per the process of FIG. 11). Based on the comparison of the aggregated values to these value ranges, the next state is transitioned to, or the state machine remains in the initial state (in which case the additional discrete samples are processed). If the next state is transitioned to, the next state can correspond to a gesture state or an intermediate state. If the next state is a gesture state, classification data is generated and indicates the classification corresponding to the gesture state. If the next state is an intermediary state, additional measurement windows are used to generated additional aggregated values that, in turn, are compared to predefined value ranges for a transition to another state, and so on. In the example flow of FIG. 15, the matching and classification (e.g., per operations 1506-1510) can be implemented using a machine learning model. For example, the aggregated values and information about the corresponding measurement windows can be input to a machine learning model that outputs, in response, the classification data.

Figure 16:
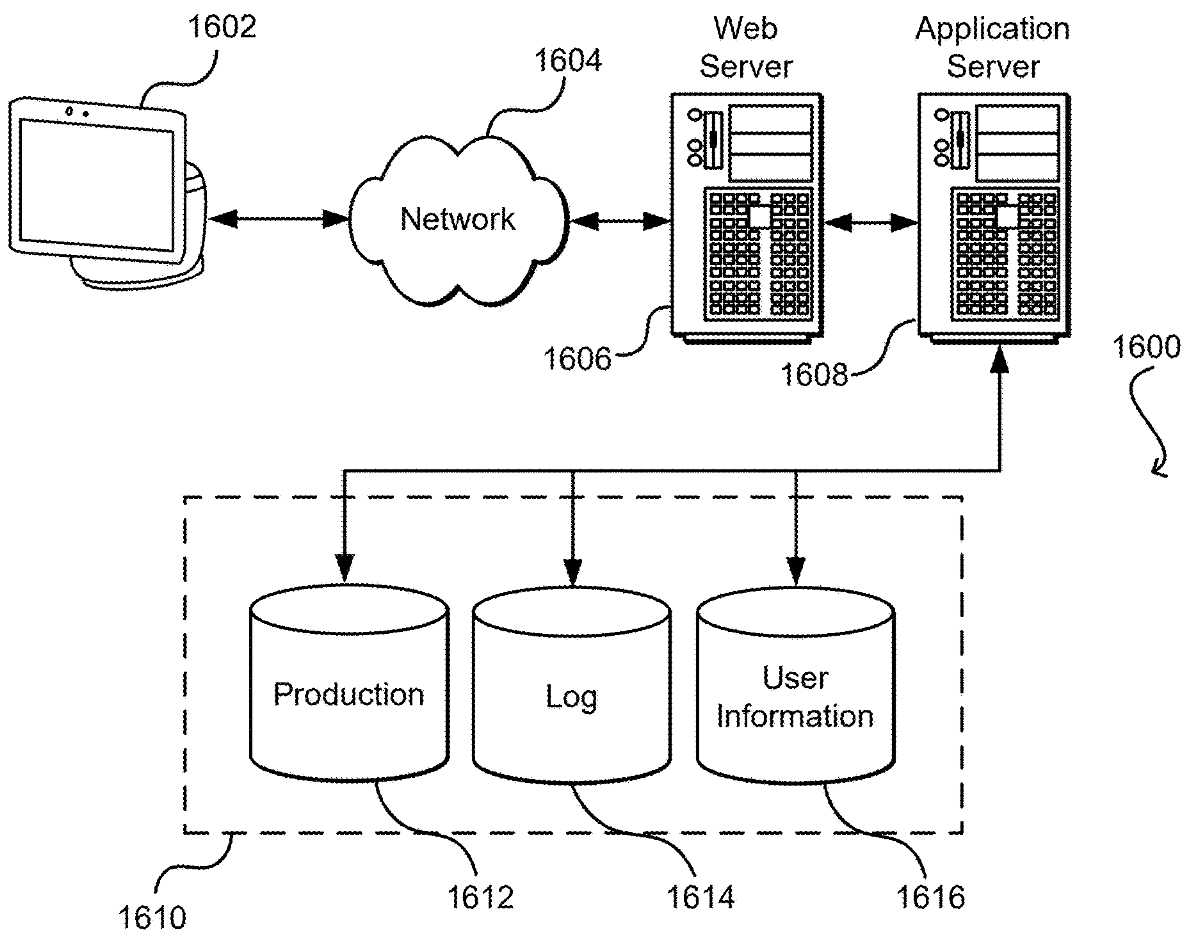
FIG. 16 illustrates an environment in which various embodiments can be implemented.

FIG. 16 illustrates aspects of an example environment 1600 for implementing aspects in accordance with various embodiments. As will be appreciated, although a Web-based environment is used for purposes of explanation, different environments may be used, as appropriate, to implement various embodiments. The environment includes an electronic client device 1602, which can include any appropriate device operable to send and receive requests, messages, or information over an appropriate network 1604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1602 and the application server 1608, can be handled by the Web server. It should be understood that the Web and application servers are not required and are merely example components, as structured code discussed herein can be executed on any appropriate device or host machine as discussed elsewhere herein.

The data store 1610 can include several separate data tables, databases or other data storage mechanisms and media for storing data relating to a particular aspect. For example, the data store illustrated includes mechanisms for storing production data 1612 and user information 1616, which can be used to serve content for the production side. The data store also is shown to include a mechanism for storing log data 1614, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1602. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

Storage and/or use of data related to a particular person or device may be controlled by a user using privacy controls associated with a device and/or a companion application associated with the device. Accordingly, users may opt out of storage of data and/or may select particular types of data that may be stored while preventing aggregation and storage of other types of data. Additionally, aggregation, storage, and use of information, as described herein, may be compliant with privacy controls, even if not technically subject to them, to bolster user trust. For example, data described herein may be treated as if it fell under acts and regulations, such as the Health Insurance Portability and Accountability Act (HIPAA) and the General Data Protection Regulation (GDPR), even if it does not actually fall under these acts and regulations.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more non-transitory computer-readable storage media storing instructions that, upon execution on a device, cause the device to perform operations comprising:

generating a plurality of discrete samples by at least sampling an output signal of a sensor of the device, the plurality of discrete samples including a first discrete sample representing a first value of the output signal at a first time point, a second discrete sample representing a second value of the output signal at a second time point, and a third discrete sample representing a third value of the output signal at a third time point;

determining that the first discrete sample and the second discrete sample are associated with a first measurement window, the first measurement window including the first time point and the second time point, excluding the third time point, and corresponding to a first portion of the output signal;

generating, based at least in part on the first value and the second value, a first aggregated value for the first measurement window;

determining, based at least in part on the first aggregated value, that the first portion of the output signal indicates that a gesture is detected at a user interface of the device;

generating, based at least in part on the first value, the second value, and the third value, a second aggregated value for a second measurement window, the second measurement window including the first time point, the second time point, and the third time point, corresponding to a second portion of the output signal, and having a longer time duration than the first measurement window;

generating classification data indicating a classification of the gesture based at least in part on the first aggregated value and the second aggregated value; and causing an operation of the device based at least in part on the classification data.

2. The one or more non-transitory computer-readable storage media of claim 1, wherein the output signal is sampled at a fixed sampling rate, and wherein the operations further comprise:

determining that the first measurement window has the shortest time duration among a plurality of measurement windows;

selecting a set of discrete samples from the plurality of discrete samples such that each discrete sample of the set is associated with a time point of the first measurement window;

based at least in part on the output signal being sampled at the fixed sampling rate, summing values corresponding to the discrete samples of the set to generate the first aggregated value; and determining that the first aggregated value is larger than a threshold value, the threshold value defined based at least in part on a range of values associated with a plurality of gesture classifications.

3. The one or more non-transitory computer-readable storage media of claim 1, wherein the output signal is sampled at a variable sampling rate, and wherein the operations further comprise:

based at least in part on the output signal being sampled at the variable sampling rate, estimating a size of an area defined by the first discrete sample and the second discrete sample, wherein the first aggregated value is generated based at least in part on the size.

4. A computer-implemented method comprising:

generating a plurality of discrete samples by at least sampling an output signal of a sensor of a device, the plurality of discrete samples including a first discrete sample representing the output signal at a first time point, a second discrete sample representing the output signal at a second time point;

generating, based at least in part on a first measurement window, a first value that represents a first portion of the output signal of the sensor of the device;

determining, based at least in part on the first value, that the first portion indicates that an interaction with the device is detected;

generating, based at least in part on a second measurement window that includes the first time point and the second time point and that overlaps at least partially with the first measurement window, a second value that represents a second portion of the output signal;

generating classification data indicating a classification of the interaction based at least in part on the first value and the second value; and causing an operation of the device based at least in part on the classification data.

5. The computer-implemented method of claim 4, further comprising:

generating a first plurality of discrete samples and a second plurality of discrete samples of the output signal, wherein the first measurement window includes the first plurality of discrete samples and excludes the second plurality of discrete samples, the second measurement window includes the first plurality of discrete samples and the second plurality of discrete samples, the first value is generated based at least in part on the first plurality of discrete samples, and the second value is generated based at least in part on the first plurality of discrete samples and the second plurality of discrete samples.

6. The computer-implemented method of claim 5, wherein the first value is generated by at least:

estimating, based at least in part on a sampling rate applied to the output signal being variable, a size of an area defined by the first plurality of discrete samples; or summing, based at least in part on the sampling rate being constant, amplitudes of the first plurality of discrete samples.

7. The computer-implemented method of claim 4, wherein both the first measurement window and the second measurement window start at a same point in time, and wherein the second measurement window has a longer time duration than the first measurement window such that the second value is greater than or equal to the first value.

8. The computer-implemented method of claim 4, wherein the first measurement window has a first time duration and the second measurement window has a second time duration, and further comprising:

determining, based at least in part on the first time duration being smaller than the second time duration, that the first measurement window instead of the second measurement window is to be used to detect the interaction.

9. The computer-implemented method of claim 4, further comprising:

determining that the first value is larger than a first threshold value, wherein the interaction is detected based at least in part on the first value being larger than the first threshold value; and comparing the first value with a second threshold value and the second value with a third threshold value, wherein the classification data is generated based at least in part on a result of the comparing.

10. The computer-implemented method of claim 4, wherein the second measurement window has a longer time duration than the first measurement window, and further comprising:

causing, based at least in part on the interaction being detected, the second value to be generated.

11. The computer-implemented method of claim 4, further comprising:

determining a first time duration for the first measurement window, wherein the first value is generated based at least in part on the first time duration, and wherein the first time duration is associated with a first type of interactions; and determining a second time duration for the second measurement window, wherein the second value is generated based at least in part on the second time duration, and wherein the second time duration is longer than the first time duration and is associated with a second type of interactions.

12. A device comprising:

one or more processors; and one or more memories storing instructions that, upon execution by the one or more processors, configure the device to:

generate a plurality of discrete samples by at least sampling an output signal of a sensor of a device, the plurality of discrete samples including a first discrete sample representing the output signal at a first time point, a second discrete sample representing the output signal at a second time point;

generate, based at least in part on a first measurement window, a first value that represents a first portion of the output signal of the sensor of the device;

determine, based at least in part on the first value, that the output signal indicates that an interaction with the device is detected;

generate, based at least in part on a second measurement window that includes the first time point and the second time point and that overlaps at least partially with the first measurement window, a second value that represents a second portion of the output signal;

generate classification data indicating a classification of the interaction based at least in part on the first value and the second value; and cause an operation of the device based at least in part on the classification data.

13. The device of claim 12, wherein the one or more memories store further instructions that, upon execution by the one or more processors, configure the device to:

determine that the first measurement window is associated with the shortest time duration among a plurality of measurement windows; and select the first measurement window to use in association with detecting the interaction based at least in part on the shortest time duration.

14. The device of claim 12, wherein the second portion includes the first portion and a third portion of the output signal, and wherein the second value corresponds to an accumulation of the first value and a third value that represents the third portion.

15. The device of claim 12, wherein the one or more memories store further instructions that, upon execution by the one or more processors, configure the device to:

forego, for a predefined time duration after the classification data is generated, determining whether a subsequent interaction is detected.

16. The device of claim 12, wherein the one or more memories store further instructions that, upon execution by the one or more processors, configure the device to:

select a set of discrete samples from a plurality of discrete samples of the output signal such that each discrete sample of the set is associated with a time point of the first measurement window; and based at least in part on the output signal being sampled at a fixed sampling rate, sum amplitudes corresponding to the discrete samples of the set to generate the first value.

17. The device of claim 12, wherein the first measurement window and the second measurement window start at a same point in time, wherein the second measurement window has a longer time duration than the first measurement window, and wherein the second value is equal to or larger than the first value.

18. The device of claim 12, wherein the one or more memories store further instructions that, upon execution by the one or more processors, configure the device to:

determine that the first measurement window has the shortest time duration among a plurality of measurement windows;

select a set of discrete samples from a plurality of discrete samples of the output signal such that each discrete sample of the set is associated with a time point of the first measurement window; and based at least in part on the output signal being sampled at a variable sampling rate, estimate a size of an area defined by the set of discrete samples, wherein the first value is generated based at least in part on the size.

19. The device of claim 12, wherein the one or more memories store further instructions that, upon execution by the one or more processors, configure the device to:

cause, based at least in part on a processing of the output signal, a different operation to be executed by the device, wherein the sensor is configured to generate the output signal in support of the different operation, and wherein the different operation is unassociated with the operation.

20. The device of claim 12, wherein the sensor comprises a microphone, wherein the first value indicates a first voltage measurement corresponding to the first portion of the output signal, wherein the second value indicates a second voltage measurement corresponding to the second portion of the output signal and including the first voltage measurement.

* * * * *